(12) United States Patent
Ishihara et al.

(10) Patent No.: US 12,492,941 B2
(45) Date of Patent: Dec. 9, 2025

(54) MEASUREMENT APPARATUS, MEASUREMENT METHOD, AND PROGRAM

(71) Applicants: Yokogawa Electric Corporation, Musashino (JP); Yokogawa Test & Measurement Corporation, Hachioji (JP)

(72) Inventors: Gentaro Ishihara, Hachioji (JP); Hiroaki Matsukawa, Hachioji (JP)

(73) Assignees: YOKOGAWA ELECTRIC CORPORATION, Tokyo (JP); YOKOGAWA TEST & MEASUREMENT CORPORATION, Tokyo (JP)

( * ) Notice: Subject to any disclaimer, the term of this patent is extended or adjusted under 35 U.S.C. 154(b) by 83 days.

(21) Appl. No.: 18/654,699

(22) Filed: May 3, 2024

(65) Prior Publication Data

US 2024/0385041 A1   Nov. 21, 2024

(30) Foreign Application Priority Data

May 16, 2023   (JP) .................................. 2023-080954

(51) Int. Cl.
*G01J 3/28* (2006.01)
*G01J 3/18* (2006.01)

(52) U.S. Cl.
CPC .. *G01J 3/28* (2013.01); *G01J 3/18* (2013.01)

(58) Field of Classification Search
CPC ........ G01J 3/28; G01J 3/18; G01J 3/04; G01J 3/0205; G01J 3/0262; G01J 3/12; G01N 21/01; G01N 21/17; G01N 2021/0112
See application file for complete search history.

(56) References Cited

U.S. PATENT DOCUMENTS

| | | | |
|---|---|---|---|
| 6,590,648 B1 * | 7/2003 | von Orelli | G01J 3/02 356/326 |
| 9,207,119 B2 * | 12/2015 | Rokitski | G01J 3/28 |
| 2009/0190127 A1 | 7/2009 | Kojima et al. | |
| 2016/0132748 A1 * | 5/2016 | Tillotson | G02B 5/201 348/222.1 |

FOREIGN PATENT DOCUMENTS

| | | | | |
|---|---|---|---|---|
| CN | 109459413 A | * | 3/2019 | ............. G01N 21/45 |
| JP | 2009-175038 A | | 8/2009 | |
| JP | 2013160651 A | * | 8/2013 | |

* cited by examiner

*Primary Examiner* — Abdullahi Nur
(74) *Attorney, Agent, or Firm* — WDHA, LLP

(57) ABSTRACT

A measurement apparatus 1 according to this disclosure includes a controller 80 and a spectroscope 10 having an optical element in which an aperture 132*a* to pass light L1 to be measured is formed. The controller 80 executes a first process to generate a synthetic spectrum Sr(i) of the narrowed light L1 by synthesizing at least a first spectrum S1(*i*) when a beam spot P of the light L1 is at a first position x1 within the aperture 132*a* and a second spectrum S2(*i*) when the beam spot P of the light L1 is at a second position x2 within the aperture 132*a*. The first position x1 includes a position shifted to one side in a predetermined direction D from a reference position x0 of the beam spot P within the aperture 132*a*. The second position x2 includes a position shifted to the other side from the reference position x0.

20 Claims, 15 Drawing Sheets

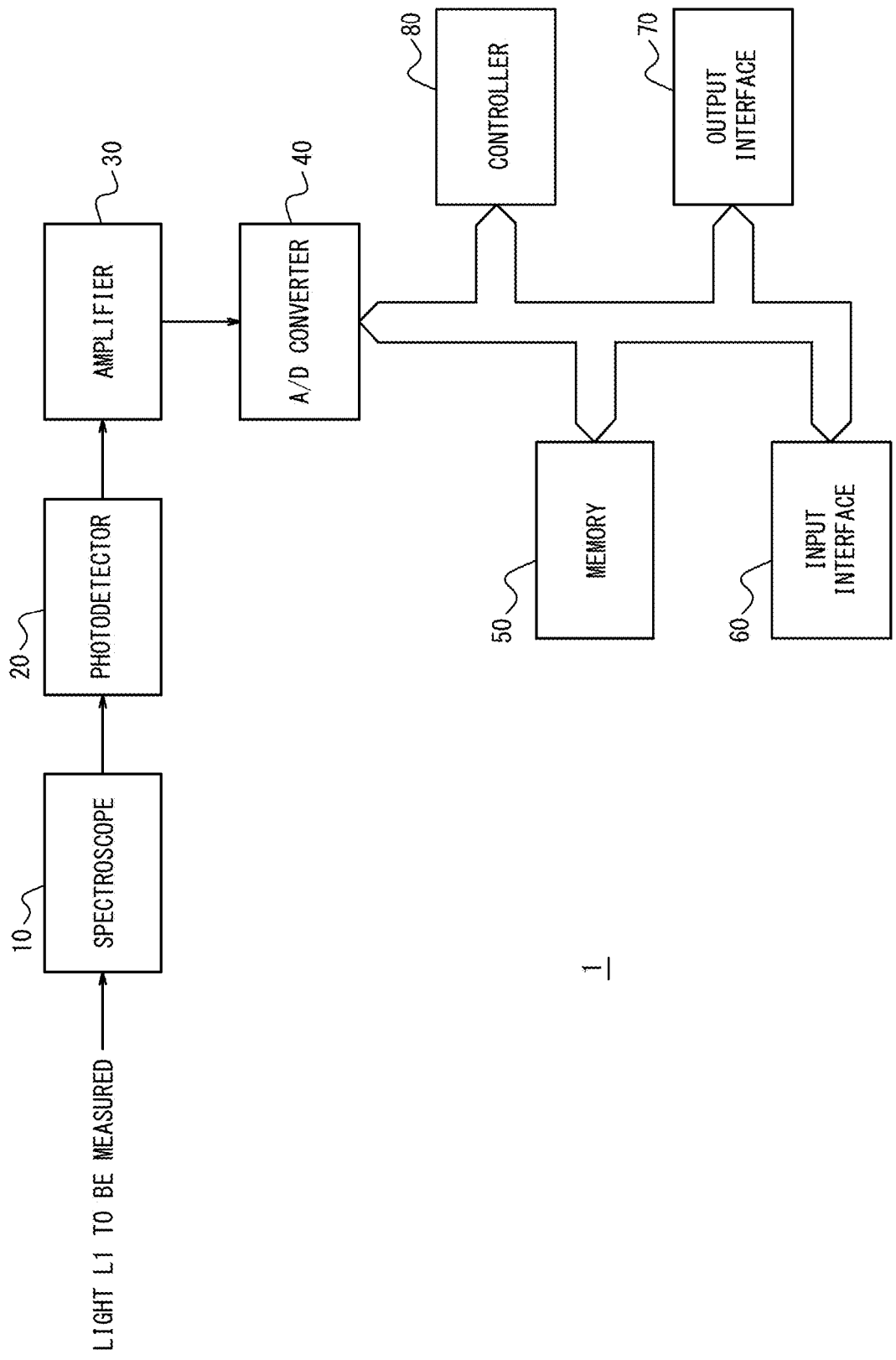

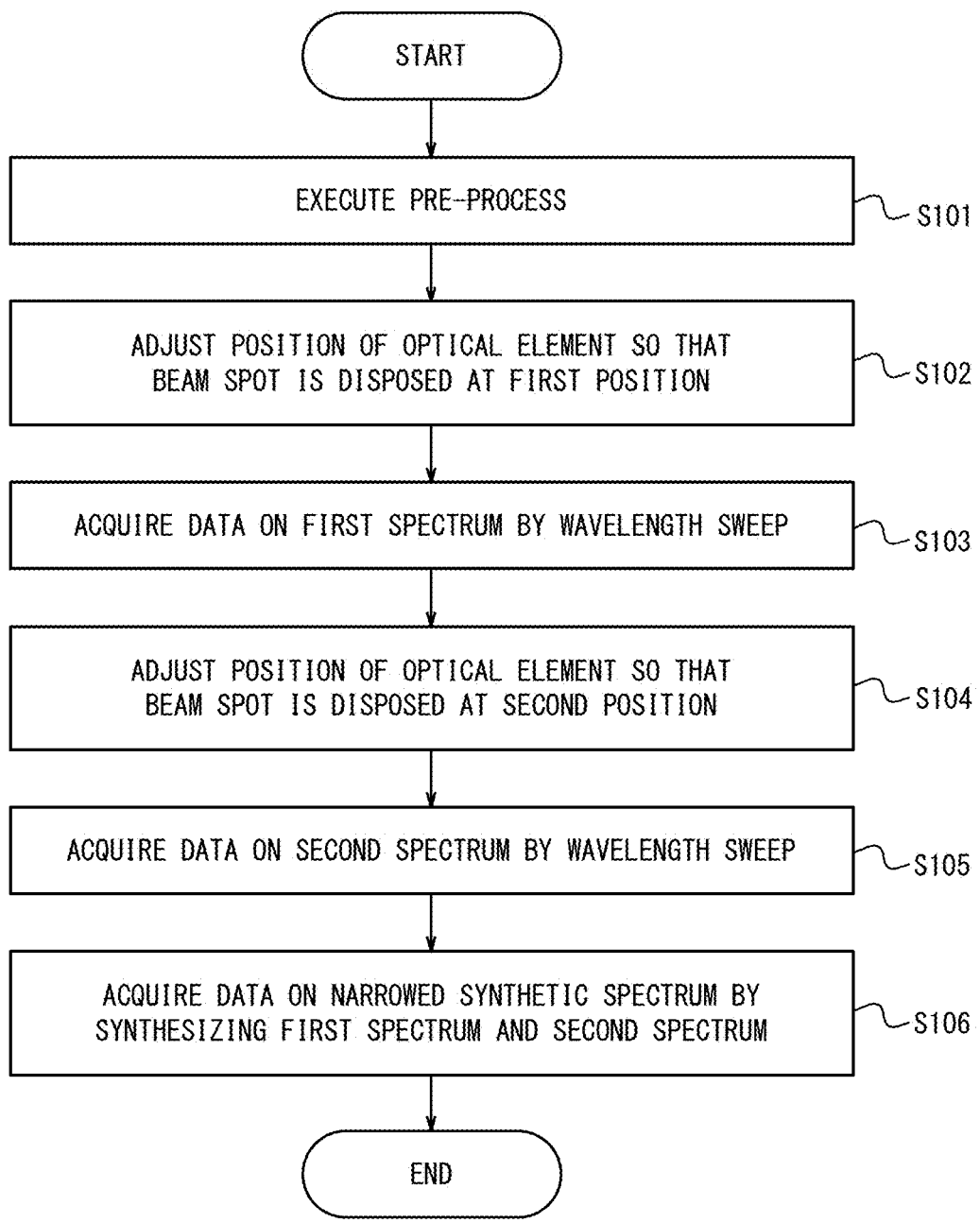

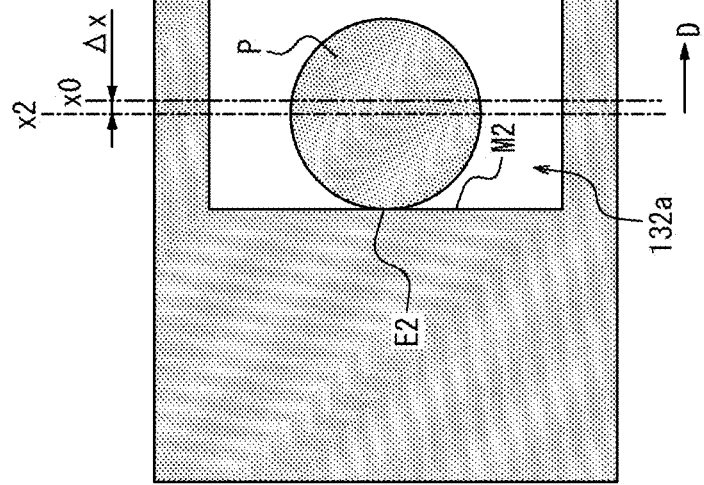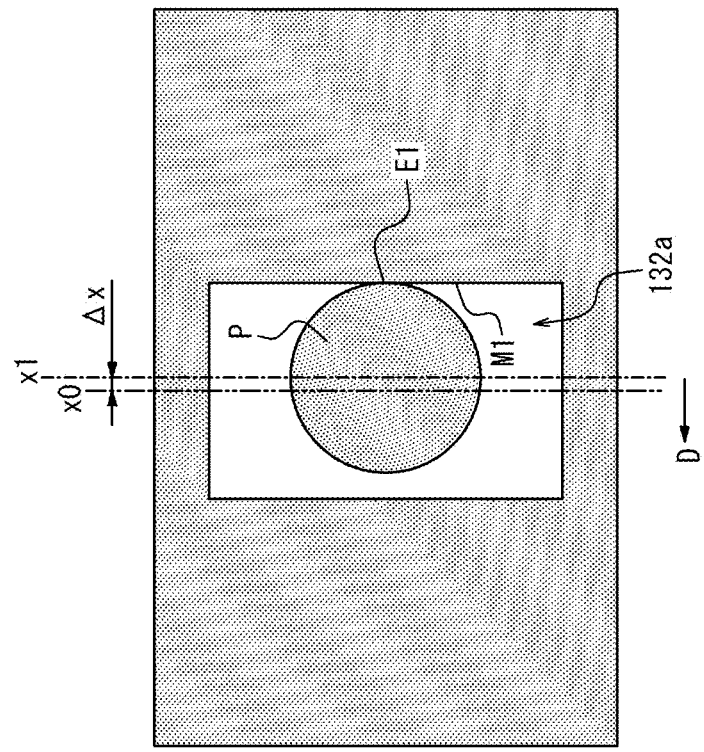

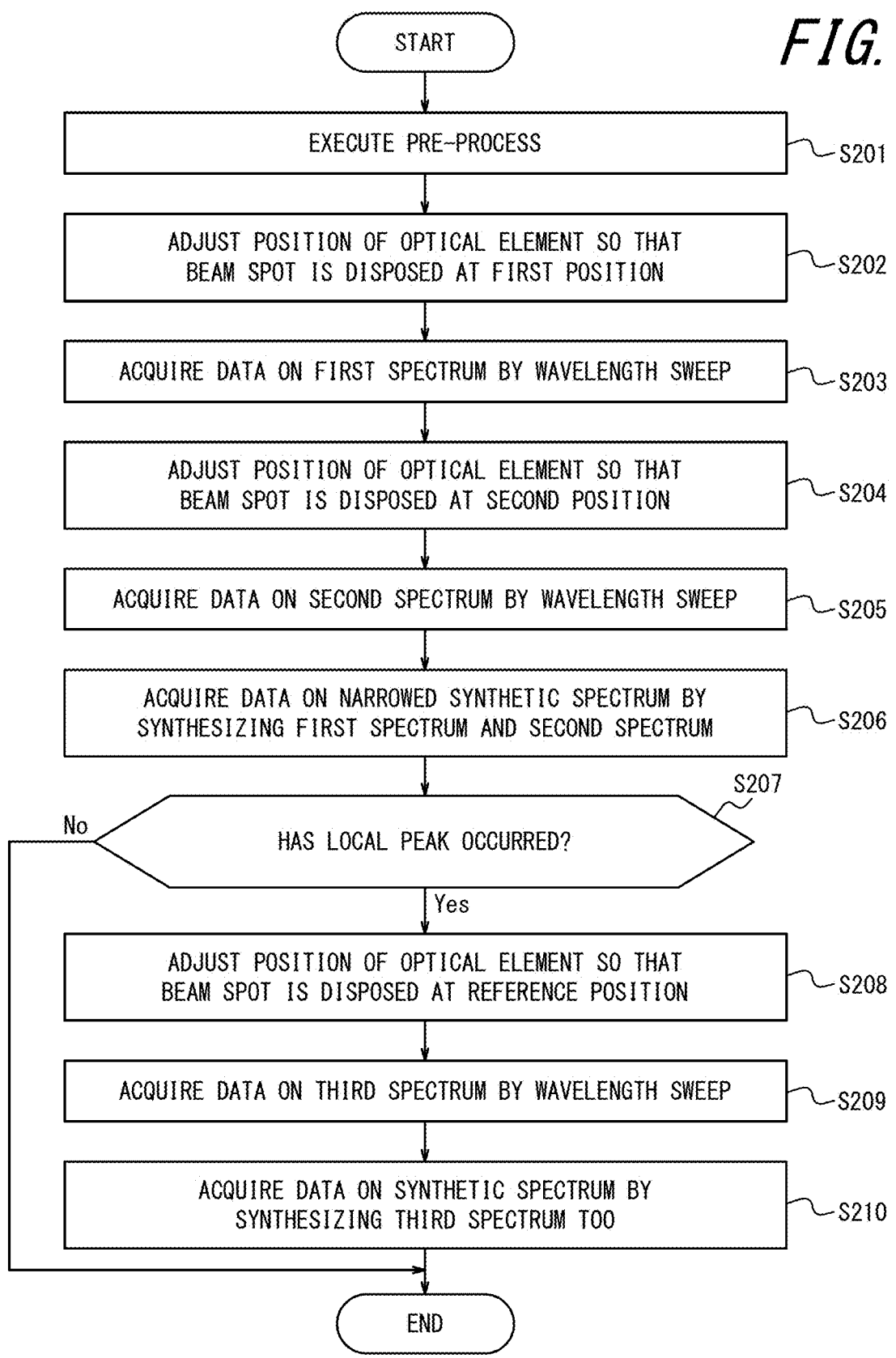

MEASUREMENT APPARATUS, MEASUREMENT METHOD, AND PROGRAM

CROSS-REFERENCE TO RELATED APPLICATION

This application claims priority to Japanese Patent Application No. 2023-080954, filed on May 16, 2023, the entire contents of which are incorporated herein by reference.

TECHNICAL FIELD

The present disclosure relates to a measurement apparatus, a measurement method, and a program.

BACKGROUND

Conventionally, for example, in order to obtain high resolution or sharp filter characteristics in wavelength ranges, multipath spectroscopes in which light to be measured is incident on a diffraction grating multiple times and passes through multiple slits are known.

For example, Patent Literature (PTL) 1 discloses a multipath spectroscope that prevents deterioration of resolution and dynamic range in spectral characteristics, which occurs when part of scattered light having occurred in spectral paths before a final spectral path follows the same optical path as diffracted light in the final spectral path.

CITATION LIST

Patent Literature

PTL 1: JP 2009-175038 A

SUMMARY

A measurement apparatus according to some embodiments includes a controller and a spectroscope having an optical element in which an aperture to pass light to be measured is formed. The controller is configured to execute a first process to generate a synthetic spectrum of the narrowed light to be measured by synthesizing at least a first spectrum when a beam spot of the light to be measured is at a first position within the aperture and a second spectrum when the beam spot of the light to be measured is at a second position within the aperture. The first position includes a position shifted to one side in a predetermined direction from a reference position of the beam spot within the aperture. The second position includes a position shifted to the other side in the predetermined direction from the reference position of the beam spot within the aperture.

BRIEF DESCRIPTION OF THE DRAWINGS

In the accompanying drawings:
FIG. 2 is a block diagram illustrating an example of the configuration of the measurement apparatus according to the embodiment of the present disclosure;
FIG. 3 is a flowchart illustrating a first example of operations of the measurement apparatus in FIG. 2;
FIGS. 4A and 4B are first figures illustrating an example of the operations of the measurement apparatus in FIG. 2;
FIG. 9 is a flowchart illustrating a second example of operations of the measurement apparatus in FIG. 2.

DETAILED DESCRIPTION

Figure 1:
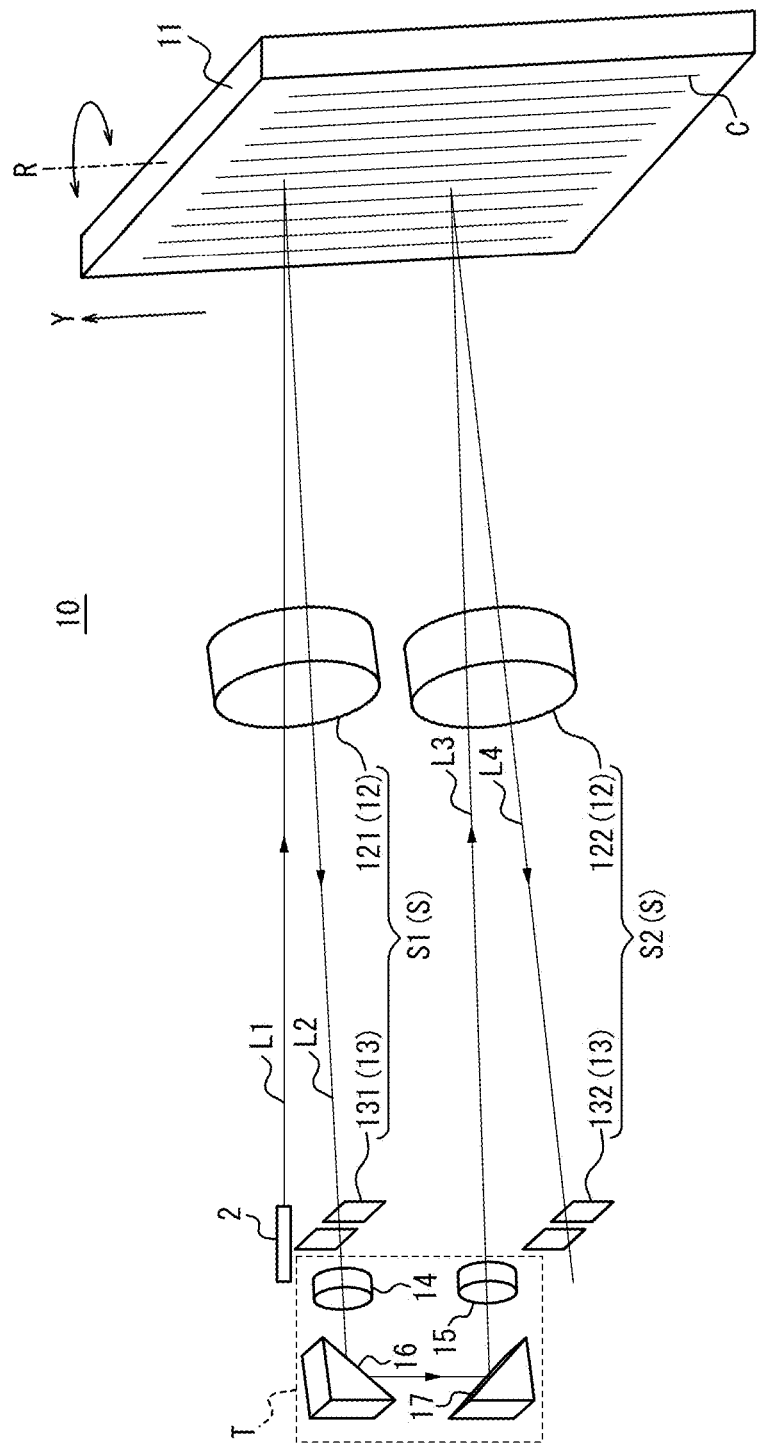
FIG. 1 is a schematic diagram illustrating an example of the configuration of a spectroscope of a measurement apparatus according to an embodiment of the present disclosure.

There is room for further improvement in terms of obtaining a sharp measurement spectrum of light to be measured with a wider dynamic range.

It would be helpful to provide a measurement apparatus, a measurement method, and a program that can improve a dynamic range for a measurement spectrum of light to be measured.

A measurement apparatus according to some embodiments includes:
a controller; and
a spectroscope having an optical element in which an aperture to pass light to be measured is formed,
wherein
the controller is configured to execute a first process to generate a synthetic spectrum of the narrowed light to be measured by synthesizing at least a first spectrum when a beam spot of the light to be measured is at a first position within the aperture and a second spectrum when the beam spot of the light to be measured is at a second position within the aperture,
the first position includes a position shifted to one side in a predetermined direction from a reference position of the beam spot within the aperture, and
the second position includes a position shifted to the other side in the predetermined direction from the reference position of the beam spot within the aperture.

Therefore, the measurement apparatus can improve a dynamic range for the synthetic spectrum of the light to be measured. The measurement apparatus executes the first process to generate the synthetic spectrum by synthesizing at least the first spectrum and the second spectrum. This allows the measurement apparatus to acquire data on the sharp synthetic spectrum with a wide dynamic range, as in a case in which a slit width is the same as an ideal spot size.

In the measurement apparatus according to one embodiment, the controller may be configured to generate the synthetic spectrum using a spectrum, between the first spectrum and the second spectrum, with lower intensity at each measurement point. This allows the measurement apparatus to generate the synthetic spectrum narrowed for each of the first spectrum and the second spectrum.

In the measurement apparatus according to one embodiment, the controller may be configured to execute a pre-process to predetermine at least one of the first position or the second position by measurement before executing the first process. This allows the measurement apparatus to measure the first spectrum and the second spectrum with high accuracy in the first process.

In the measurement apparatus according to one embodiment, the controller may be configured, in the pre-process, to calculate a first distance range in which the intensity of a light spectrum is maintained, by shifting the position of the beam spot from the reference position to the one side in steps of a predetermined distance, and determine the first position based on the first distance range. This allows the measurement apparatus to measure the first position with high accuracy.

In the measurement apparatus according to one embodiment, the controller may be configured, in the pre-process, to calculate a second distance range in which the intensity of a light spectrum is maintained, by shifting the position of the beam spot from the reference position to the other side in steps of a predetermined distance, and determine the second position based on the second distance range. This allows the measurement apparatus to measure the second position with high accuracy.

In the measurement apparatus according to one embodiment, the controller may be configured, in the first process, to determine whether a local peak has occurred between a pair of peaks adjacent to each other in the synthetic spectrum when the first spectrum and the second spectrum have been synthesized. This allows the measurement apparatus to also deal with the local peak, which is not originally included in laser light to be measured and is undesirable as measurement data. For example, the measurement apparatus can also execute an arithmetic process to reduce such a local peak.

In the measurement apparatus according to one embodiment, upon determining that the local peak has occurred, the controller may generate the synthetic spectrum by synthesizing, in addition to the first spectrum and the second spectrum, a third spectrum when the beam spot is at the reference position. This allows the measurement apparatus to generate the sharp synthetic spectrum with a wide dynamic range while preventing the occurrence of the local peak.

In the measurement apparatus according to one embodiment, the controller may be configured to generate the synthetic spectrum using a spectrum, among the first spectrum, the second spectrum, and the third spectrum, with the lowest intensity at each measurement point. This allows the measurement apparatus to generate the synthetic spectrum narrowed for each of the first spectrum, the second spectrum, and the third spectrum, while preventing the occurrence of the local peak.

In the measurement apparatus according to one embodiment, upon determining that the local peak has occurred, the controller may cause the local peak to be displayed in a different aspect from other portions. This allows the measurement apparatus to clearly indicate, to a user, the position of the local peak in the synthetic spectrum. The user can easily determine which portion in the measured synthetic spectrum is the local peak.

In the measurement apparatus according to one embodiment, upon determining that the local peak has occurred, the controller may execute an interpolation process based on data on both sides of the local peak, and update light spectrum data at the local peak. This allows the measurement apparatus to reduce the local peak in the synthetic spectrum, in the same manner as when a process associated with the third spectrum is executed.

In the measurement apparatus according to one embodiment, the controller may be configured to cause a portion for which data has been updated in the synthetic spectrum to be displayed in a different aspect from other portions. This allows the measurement apparatus to clearly indicate, to the user, the position of the portion for which data has been updated in the synthetic spectrum. The user can easily determine the portion for which data has been updated in the measured synthetic spectrum.

In the measurement apparatus according to one embodiment, upon determining that the local peak has occurred, the controller may switch to a second process to measure a reference spectrum of the light to be measured at the reference position. This allows the measurement apparatus to acquire optical spectrum data on the light to be measured based on the reference spectrum that exhibits no local peaks.

In the measurement apparatus according to one embodiment, the controller is configured to switch and execute one of the first process and a second process to measure a reference spectrum of the light to be measured at the reference position, in response to a user's selection input. Thereby, the measurement apparatus can allow the user to select whether to prefer an improved dynamic range by the synthetic spectrum or to prefer a shorter measurement time by the reference spectrum at a reduced dynamic range. The user can also have the measurement apparatus acquire data on the reference spectrum when aiming at shortening the measurement time rather than the improved dynamic range, and have the measurement apparatus acquire data on the synthetic spectrum when aiming at improving the dynamic range. Therefore, the convenience of the measurement apparatus is improved.

In the measurement apparatus according to one embodiment, the reference position may include a center position of the aperture in the predetermined direction. This allows the measurement apparatus to improve the symmetry of a waveform with respect to the synthetic spectrum.

In the measurement apparatus according to one embodiment, the predetermined direction may include a shortitudinal direction of the aperture. This allows the measurement apparatus to remove, using the optical element, stray light mixed around the beam spot along the shortitudinal direction. The measurement apparatus can prevent the influence of stray light mixed in such a shortitudinal direction on the synthetic spectrum.

In the measurement apparatus according to one embodiment, a first distance from the reference position to the first position and a second distance from the reference position to the second position may be the same as each other. This allows the measurement apparatus to improve the symmetry of a waveform with respect to the synthetic spectrum.

In the measurement apparatus according to one embodiment, the first position may include a center position of the beam spot when a first end of the beam spot at the one side contacts a first edge of the aperture. This allows the measurement apparatus to remove, using the optical element with the aperture, the most stray light mixed on the one side in the predetermined direction with respect to the beam spot.

In the measurement apparatus according to one embodiment, the second position may include a center position of the beam spot when a second end of the beam spot at the other side contacts a second edge of the aperture. This allows the measurement apparatus to remove, using the optical element with the aperture, the most stray light mixed on the other side in the predetermined direction with respect to the beam spot.

A measurement method according to some embodiments is a measurement method performed by a measurement apparatus including a spectroscope having an optical element in which an aperture to pass light to be measured is formed, the measurement method including:

executing a first process to generate a synthetic spectrum of the narrowed light to be measured by synthesizing at least a first spectrum when a beam spot of the light to be measured is at a first position within the aperture and a second spectrum when the beam spot of the light to be measured is at a second position within the aperture, wherein the first position includes a position shifted to one side in a predetermined direction from a reference position of the beam spot within the aperture, and the second position includes a position shifted to the other side in the predetermined direction from the reference position of the beam spot within the aperture.

The measurement apparatus can thereby improve a dynamic range for the synthetic spectrum of the light to be measured. The measurement apparatus executes the first process to generate the synthetic spectrum by synthesizing at least the first spectrum and the second spectrum. This allows the measurement apparatus to acquire data on the sharp synthetic spectrum with a wide dynamic range, as in a case in which a slit width is the same as an ideal spot size.

A program according to some embodiments is configured to cause a measurement apparatus to execute an operation, the measurement apparatus including a spectroscope having an optical element in which an aperture to pass light to be measured is formed, the operation including:

executing a first process to generate a synthetic spectrum of the narrowed light to be measured by synthesizing at least a first spectrum when a beam spot of the light to be measured is at a first position within the aperture and a second spectrum when the beam spot of the light to be measured is at a second position within the aperture, wherein the first position includes a position shifted to one side in a predetermined direction from a reference position of the beam spot within the aperture, and the second position includes a position shifted to the other side in the predetermined direction from the reference position of the beam spot within the aperture.

The measurement apparatus can thereby improve a dynamic range for the synthetic spectrum of the light to be measured. The measurement apparatus executes the first process to generate the synthetic spectrum by synthesizing at least the first spectrum and the second spectrum. This allows the measurement apparatus to acquire data on the sharp synthetic spectrum with a wide dynamic range, as in a case in which a slit width is the same as an ideal spot size.

According to the present disclosure, it is possible to provide a measurement apparatus, a measurement method, and a program that can improve a dynamic range for a measurement spectrum of light to be measured.

The background and a problem of conventional technology will be described in more detail.

As disclosed as an example in PTL 1, multipath spectroscopes are known to obtain high resolution and wide dynamic range for resolution and dynamic range, which represent the performance of spectroscopes such as monochromators. In the multipath spectroscopes, light to be measured is incident multiple times on a diffraction grating and passes through multiple slits.

A multipath spectroscope described in PTL 1 is based on a subtractive dispersion method. The spectroscope of the subtractive dispersion method has a first spectral path from a light incident means to a first slit and a second spectral path from the first slit to a second slit. In the spectroscope, light to be measured passes through the first spectral path and the second spectral path in this order.

According to the multipath spectroscope with this configuration, the light to be measured is dispersed in the first spectral path. The light to be measured dispersed by the first spectral path forms an image on the second slit in the second spectral path and passes through the second slit. At this time, scattered light and other stray light having occurred inside the spectroscope are mixed around a beam spot of the light to be measured that forms the image at an aperture of the second slit. Such stray light reduces sharpness in a measurement spectrum of the light to be measured, resulting in a decrease in dynamic range.

As an example, the second slit blocks and removes such stray light, preventing the stray light from being incident on a photodetector. Therefore, the same effect as when two stages of optical filters are disposed in series in an optical path of the light to be measured is obtained, and high resolution and wide dynamic range can be obtained. As described above, the second slit has the function of sharpening the measurement spectrum of the light to be measured and improving the dynamic range.

Figure 11:
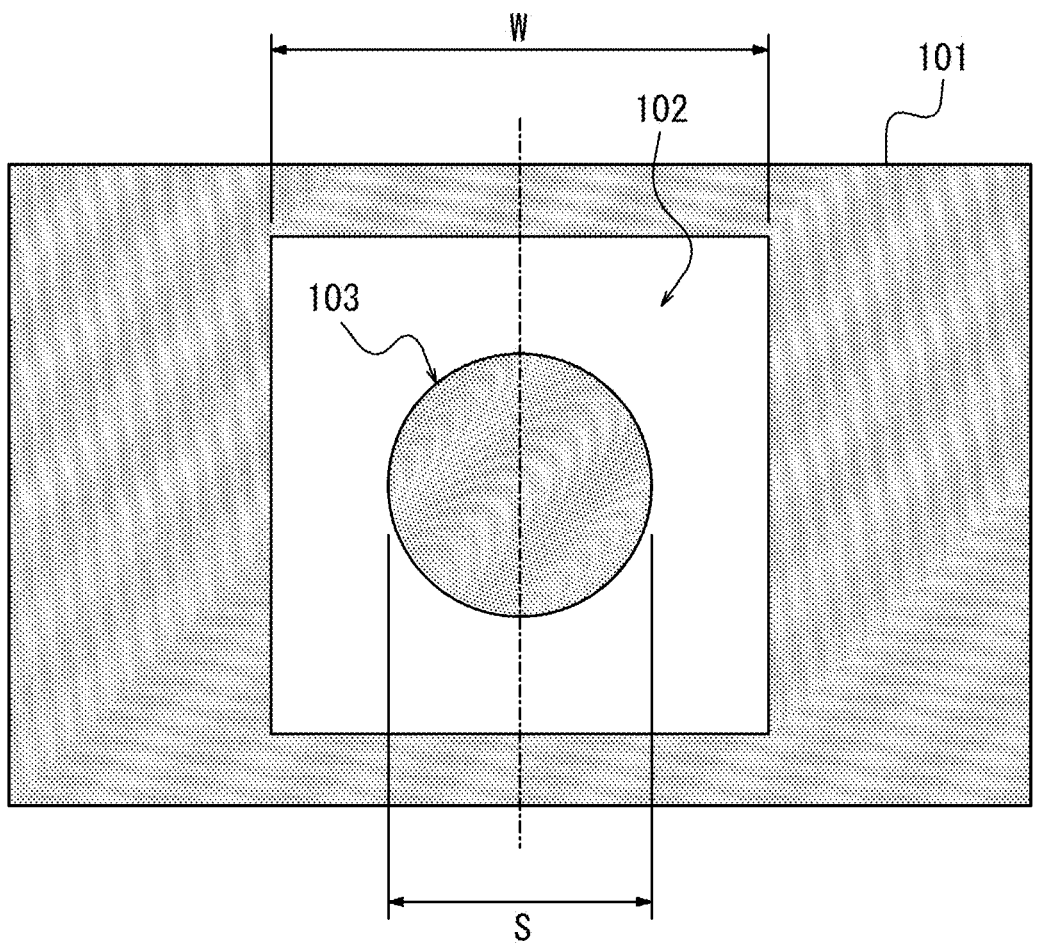
FIG. 11 is a first figure illustrating a problem of conventional technology.

FIG. 11 is a first figure to illustrate the problem of the conventional technology. FIG. 11 illustrates the relationship between the spot size of the beam spot of the light to be measured at the second slit and the slit width of the slit formed as the aperture.

The second slit has a slit plate 101 that constitutes the periphery of the aperture, and a slit 102 that is formed as the aperture in the slit plate 101. The slit 102 passes the light to be measured, which is configured as the beam spot. Regarding a beam spot 103 formed in the slit 102 of the slit plate 101, w denotes the slit width of the slit 102 and s denotes the spot size of the beam spot 103.

A flow of the process of measuring an optical spectrum of the light to be measured using the conventional spectroscope will be described. When a measurement is started using the spectroscope, a motor is controlled to adjust the position of the slit 102 relative to the beam spot 103, and the position of the second slit is adjusted so that the beam spot 103 is disposed at a center position of the slit 102. For example, when a measurement apparatus with the spectroscope is carried around, the alignment of optical elements, such as mirrors and lenses, of the spectroscope may shift, resulting in a slight misalignment of the position of the beam spot 103. To eliminate such misalignment and to dispose the beam spot 103 at the center position of the slit 102, the second slit is provided with the motor.

By performing a wavelength sweep on the light to be measured by rotating a diffraction grating of the spectroscope, data on a measurement spectrum S(i) of the light to be measured is acquired. This completes the measurement using the spectroscope. By adjusting the position of the second slit to the center based on the process described above, the symmetry of a waveform of the measurement spectrum of the light to be measured is improved.

Figure 12:
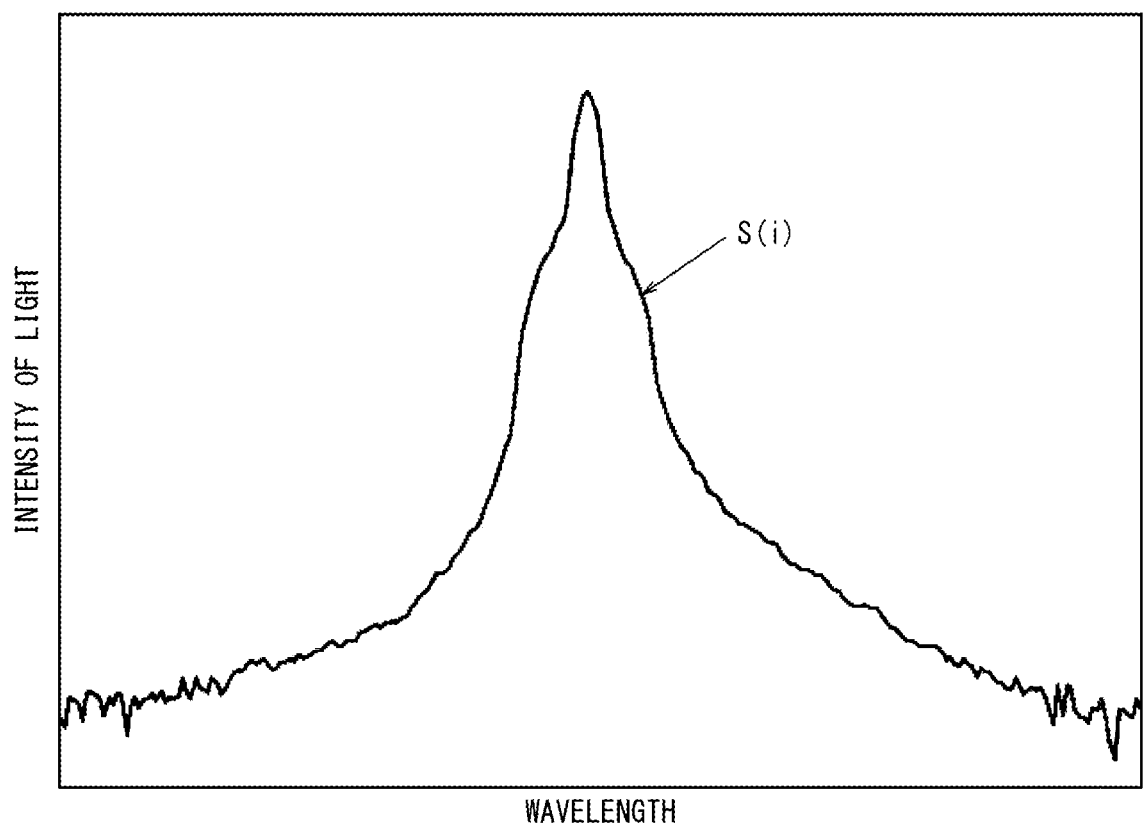
FIG. 12 is a second figure illustrating the problem of the conventional technology.

FIG. 12 is a second figure to illustrate the problem of the conventional technology. FIG. 12 illustrates an example of the optical spectrum of the light to be measured using the conventional technology. HeNe laser light with a wavelength of 1523 nm, which is single longitudinal mode laser light, is used as the light to be measured. In the graph in FIG. 12, the horizontal axis represents wavelength, and the vertical axis represents the intensity of light, i.e., the intensity of the measurement spectrum of the light to be measured.

Figures 13A, 13B, 13C:
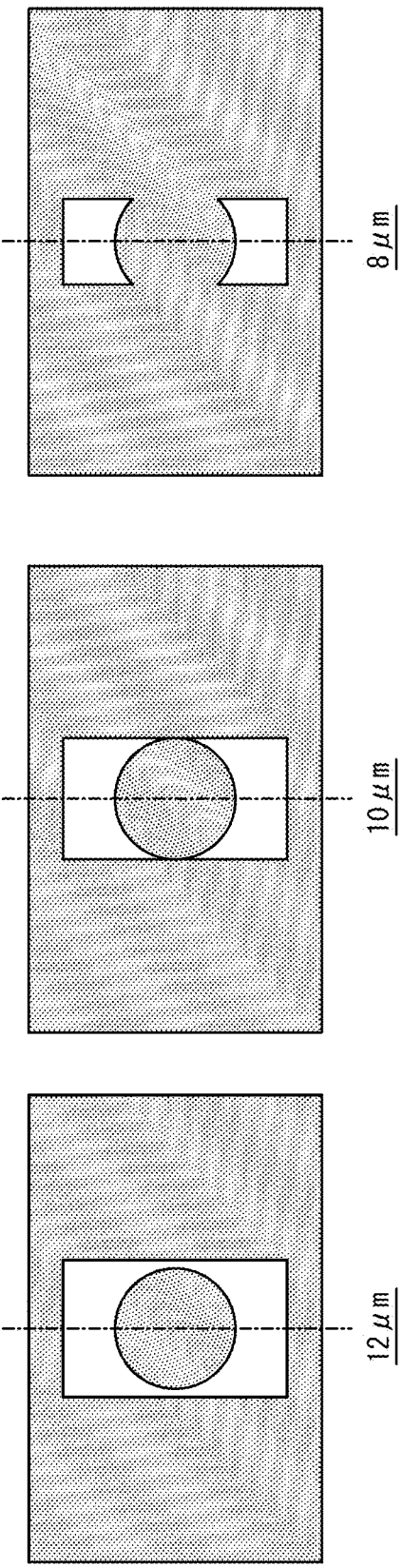
FIGS. 13A to 13C are third figures illustrating the problem of the conventional technology.

FIGS. 13A to 13C are third figures to illustrate the problem of the conventional technology. FIGS. 13A to 13C represent the relationship between the slit width w and the spot size s when a plurality of second slits with slit widths w different from each other are prepared. In an example illustrated in FIGS. 13A to 13C, the spot size s is 10 μm. The slit widths w are 12 μm (FIG. 13A), 10 μm (FIG. 13B), and 8 μm (FIG. 13C).

Figure 14:
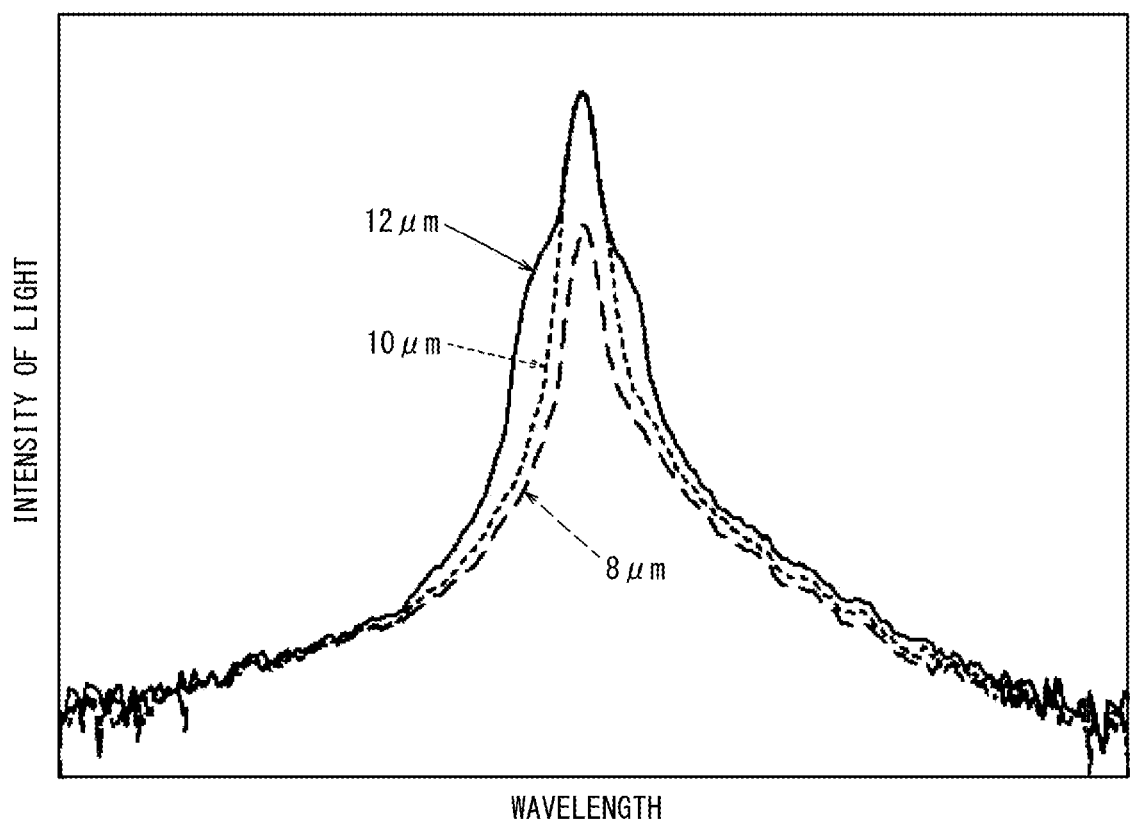
FIG. 14 is a fourth figure illustrating the problem of the conventional technology.

FIG. 14 is a fourth figure to illustrate the problem of the conventional technology. FIG. 14 illustrates data on optical spectra of the light to be measured, each measured using the plurality of second slits with the slit widths w different from each other, as described in FIGS. 13A to 13C.

When the slit width w is wider than the spot size s, as in the example illustrated in FIG. 13A, the measurement spectrum is wide due to stray light mixed in, as illustrated by the solid line in FIG. 14. In the measurement spectrum of the light to be measured, sharpness is reduced and dynamic range is reduced. Referring to the example illustrated in FIG. 13B, when the slit width w is the same as the spot size s, as illustrated by the dotted line in FIG. 14, the sharp measurement spectrum with a wider dynamic range is obtained compared to the solid line. This is because the narrow slit width w eliminates the stray light mixed around the beam spot 103.

On the other hand, when the slit width w is narrower than the spot size s, as in the example illustrated in FIG. 13C, the slit 102 is too narrow, and part of the dispersed light to be measured, which should normally pass through the slit 102, is blocked by the second slit. As a result, as illustrated by the dashed line in FIG. 14, the intensity of the light is reduced in data on the measured light spectrum and its peak intensity is reduced.

As described above, when a slit such as the second slit removes stray light, a narrower slit width w removes more stray light than a wider slit, and a sharp measurement spectrum with a wider dynamic range is obtained. Therefore, from the viewpoint of obtaining the sharp measurement spectrum, it is desirable to set the slit width w narrow. However, when the slit width w is narrower than the spot size s, part of the light to be measured, which should pass through the slit, is blocked and the intensity of the measurement spectrum is reduced.

Therefore, setting the slit width w as being the same as the spot size s is a condition for obtaining a sharp measurement spectrum with a wide dynamic range without intensity reduction.

Generally, optical aberrations occur due to performance variations in optical components that constitute the spectroscope, and the spot size s is slightly larger than an ideal size in an actual optical system. During mass production of spectroscopes, the spot size s varies slightly in individual spectroscopes. Therefore, to deal with the occurrence of variations in the spot size s, the slit width w should be set to a value slightly larger than a value set for the ideal spot size s. The slit width w needs to be somewhat wider, and this results in reduction in the sharpness of a measurement spectrum of light to be measured.

In order to solve the above problem, it would be helpful to provide a measurement apparatus, a measurement method, and a program that can improve a dynamic range for a measurement spectrum of light to be measured. For example, it would be helpful that a sharp measurement spectrum can be obtained with a wide dynamic range, even when a slit width w needs to be somewhat wider than an ideal spot size s, as in a case in which the slit width w is the same as the ideal spot size s.

An embodiment of the present disclosure will be mainly described below with reference to the accompanying drawings.

FIG. 1 is a schematic diagram illustrating an example of the configuration of a spectroscope 10 of a measurement apparatus 1 according to the embodiment of the present disclosure. With reference to FIG. 1, an example of the configuration and function of the spectroscope 10 of the measurement apparatus 1 will be mainly described.

The spectroscope 10 according to the embodiment disperses light L1 to be measured, which is emitted from a light guide component 2 such as an optical fiber and incident on the spectroscope 10. The spectroscope 10 has a diffraction grating 11, a plurality of spectral systems S, and at least one return optical system T. The spectroscope 10 according to the embodiment has two spectral systems S and one return optical system T. The two spectral systems S are hereinafter denoted as a first spectral system S1 and a second spectral system S2 when distinguishing the two spectral systems S from each other.

The diffraction grating 11 is a reflector having a plurality of engraved lines C extending in parallel at regular intervals. The diffraction grating 11 disperses light incident on the diffraction grating 11 and emits diffracted light as returned light. The diffraction grating 11 can be rotated, by any driving mechanism, around a rotation axis R at the center of the diffraction grating 11, which extends in parallel to an extension direction Y of the engraved lines C. The diffraction grating 11 can arbitrarily vary an apparent spacing of the engraved lines C relative to the incident light.

The plurality of spectral systems S each have a collimator 12 that collimates light incident on the spectral system S. The collimator 12 gathers the returned light, from the diffraction grating 11, of the light collimated by the collimator 12 and incident on the diffraction grating 11. The collimators 12 are disposed between an incident side of the spectral systems S and the diffraction grating 11. The collimator 12 includes, for example, a collimation lens.

The plurality of spectral systems S each have an optical element 13 that is disposed in such a position that the return light, from the diffraction grating 11, of the light collimated by the collimator 12 and incident on the diffraction grating 11 is focused and that passes at least part of the returned light. For example, the optical elements 13 are disposed in such positions that the returned light from the diffraction grating 11 is focused by the collimators 12. The optical elements 13 include any optical elements, such as slits, pinholes, or apertures.

The first spectral system S1 is disposed on the light guide component 2 side most in the extension direction Y of the engraved lines C. In other words, the first spectral system S1 passes the light L1 to be measured, which is emitted from the light guide component 2 and incident on the spectroscope 10, first among the plurality of spectral systems S. The first spectral system S1 has a first collimator 121 and a first optical element 131. In addition, the first spectral system S1 includes an optical path from an optical path portion of the light L1 to be measured immediately after the light L1 to be measured exits the light guide component 2 to the first optical element 131.

The light L1 to be measured, which is emitted from the light guide component 2 and incident on the first spectral system S1 while diffusing, is collimated by the first collimator 121. The light L1 to be measured, which is collimated by the first collimator 121, is incident on the diffraction grating 11. At this time, diffracted light L2 is generated, as return light from the diffraction grating 11, based on the light L1 to be measured incident on the diffraction grating 11. The diffracted light L2 passes through the first collimator 121 and is focused at the position of the first optical element 131. At least part of the diffracted light L2 passes through the first optical element 131.

The second spectral system S2 is disposed on the opposite side of the light guide component 2 than the first spectral system S1 in the extension direction Y of the engraved lines C. The second spectral system S2 passes light L3, which exits the first spectral system S1 and the return optical system T. The second spectral system S2 has a second collimator 122 and a second optical element 132. In addition, the second spectral system S2 includes an optical path from an optical path portion of the light L3 immediately after the light L3 exits the return optical system T to the second optical element 132.

The light L3 incident on the second spectral system S2 is collimated by the second collimator 122. The light L3 collimated by the second collimator 122 is incident on the diffraction grating 11. At this time, diffracted light L4 is generated, as returned light from the diffraction grating 11, based on the light L3 incident on the diffraction grating 11. The diffracted light L4 passes through the second collimator 122 and is focused at the position of the second optical element 132. At least part of the diffracted light L4 passes through the second optical element 132.

The return optical system T guides the returned light generated in one of the two adjacent spectral systems S back toward the other spectral system S. The return optical system T has a first lens 14, which collimates the returned light generated in one spectral system S, and a second lens 15, which gathers the returned light collimated by the first lens 14 between the first lens 14 and the collimator 12 of the other spectral system S.

For example, the return optical system T guides the diffracted light L2 generated in the first spectral system S1, of the adjacent first and second spectral systems S1 and S2, back toward the second spectral system S2. In the return optical system T, for example, the first lens 14, a first mirror 16, a second mirror 17, and the second lens 15 are disposed in order from an incident side of the diffracted light L2 to an exit side.

The first lens 14 collimates the diffracted light L2, which is generated in the first spectral system S1. The first lens 14 is disposed so as to sandwich the first optical element 131 of the first spectral system S1 together with the first collimator 121 of the first spectral system S1. The first mirror 16 reflects the diffracted light L2, which is collimated by the first lens 14, toward the extension direction Y of the engraved lines C of the diffraction grating 11. The second mirror 17 reflects the diffracted light L2, which is reflected by the first mirror 16, toward the diffraction grating 11 and leads the diffracted light L2 to the second lens 15. The second lens 15 gathers the diffracted light L2, which is collimated by the first lens 14, between the second collimator 122 of the second spectral system S2 and the second lens 15.

The diffracted light L2 is focused once at the position of the first optical element 131 of the first spectral system S1, and then is incident on the first lens 14 while diffusing. The diffracted light L2 is collimated by the first lens 14 and is reflected, as collimated light, by the first mirror 16 and the second mirror 17. The diffracted light L2 is incident on the second lens 15 and is focused between the second collimator 122 of the second spectral system S2 and the second lens 15.

In the spectroscope 10 as described above, the first optical element 131 has the function of wavelength selection by passing at least part of the light L1 to be measured that is dispersed by the diffraction grating 11. On the other hand, the second optical element 132 blocks and removes stray light mixed around a beam spot of the diffracted light L4 formed in an aperture formed in the second optical element 132, in order to prevent the stray light from being incident on a photodetector. The second optical element 132 has the function of sharpening a measurement spectrum of the light L1 to be measured, by blocking the stray light, and improving a dynamic range.

In the spectroscope 10 having an optical element, e.g., the second optical element 132 with an aperture formed to pass the light L1 to be measured that eventually becomes the diffracted light L4, a method of further improving the dynamic range of the measurement spectrum of the light L1 to be measured by an arithmetic process by the measurement apparatus 1 using the optical element will be mainly described below.

FIG. 2 is a block diagram illustrating an example of the configuration of the measurement apparatus 1 according to the embodiment of the present disclosure. With reference to FIG. 2, an example of the configuration and function of the measurement apparatus 1 with the spectroscope 10 as illustrated in FIG. 1 will be mainly described.

The measurement apparatus 1 includes an optical spectrum analyzer or the like. The measurement apparatus 1 is an apparatus that analyzes laser light emitted from a laser oscillator or the like, as the light L1 to be measured. More specifically, the measurement apparatus 1 analyzes the wavelength of the light L1 to be measured.

The measurement apparatus 1 has a photodetector 20, an amplifier 30, an A/D converter 40, a memory 50, an input interface 60, an output interface 70, and a controller 80, in addition to the spectroscope 10 as illustrated in FIG. 1. The spectroscope 10 receives the light L1 to be measured, such as laser light, that is incident through an optical fiber, for example, and disperses the light L1 to be measured. The spectroscope 10 extracts and outputs light of a desired wavelength component included in the light L1 to be measured.

The photodetector 20 includes any detector including a light receiving element such as a photodiode. The photodetector 20 is disposed so that a light-receiving surface is opposite the spectroscope 10, and receives the light L1 to be measured that has been received by the spectroscope 10. The photodetector 20 receives the light that has exited from the spectroscope 10, converts the light into an electrical signal, and outputs the signal. A wavelength band that can be received by photodetector 20 includes the wavelength band of the light L1 to be measured. The photodetector 20 has detection sensitivity at the wavelength of the light L1 to be measured.

The amplifier 30 includes an amplifier or the like that amplifies a light-receiving signal that has been output from the photodetector 20. The amplifier 30 amplifies the light-receiving signal, as the electrical signal, that has been output from the photodetector 20, and outputs the light-receiving signal to the A/D converter 40.

The A/D converter 40 acquires, from the photodetector 20, the light-receiving signal that has been amplified by the amplifier 30, and converts the light-receiving signal from an analog signal into a digital signal. The A/D converter 40 outputs the converted digital signal, as measurement data, to a bus to which the controller 80 is connected.

The memory 50 includes storage devices such as a hard disk drive (HDD), a solid state drive (SSD), electrically erasable programmable read-only memory (EEPROM), read-only memory (ROM), and random access memory (RAM). The memory 50 stores information necessary to realize operations of the measurement apparatus 1. The memory 50 stores information obtained by the operations of the measurement apparatus 1. For example, the memory 50 stores a system program, an application program, and various data obtained by any means such as a communication interface.

The memory 50 may function as a main memory, an auxiliary memory, or a cache memory. The memory 50 is not limited to one built in the measurement apparatus 1, but may include an external storage device connected through a digital input/output port such as a universal serial bus (USB) port.

The input interface 60 includes one or more input interfaces that detect user input and acquire input information based on user operation. The input interfaces include a physical key, a capacitive key, a touch screen integrated with a display of the output interface 70, an imaging module such as a camera, and a microphone that receives voice input.

The output interface 70 includes one or more output interfaces that output information and notify a user. The output interfaces include a display that outputs information in the form of images, a speaker that outputs information in the form of sound, and a vibrator that outputs information in the form of vibrations. The display includes a liquid crystal display (LCD), an organic electroluminescence (EL) display, and the like.

The controller 80 includes one or more processors. In this disclosure, the "processor" is a general purpose processor or a dedicated processor specialized for particular processes, but is not limited to these. The controller 80 includes, for example, a central processing unit (CPU) or the like. The controller 80 is communicably connected to each of components constituting the measurement apparatus 1, and controls the operations of the entire measurement apparatus 1. The controller 80 acquires optical spectrum data by executing a predetermined arithmetic process on acquired measurement data, and displays the optical spectrum data on the output interface 70.

FIG. 3 is a flowchart illustrating a first example of the operations of the measurement apparatus 1 in FIG. 2. With reference to FIG. 3, the first example of a measurement method executed by the measurement apparatus 1 in FIG. 2 will be mainly described. The measurement apparatus 1 has the spectroscope 10 with an optical element, such as the second optical element 132 in which the aperture to pass the light L1 to be measured is formed. The measurement method will be described below, as an example, with the second optical element 132 of the spectroscope 10 corresponding to an "optical element" described in the claims.

In step S101, the controller 80 of the measurement apparatus 1 executes a pre-process. In the present disclosure, the "pre-process" includes, for example, a process to pre-determine, by measurement, at least one of a first position required for a process in step S102 or a second position required for a process in step S104, before a first process is executed. In the example illustrated in FIG. 3, the first process includes, for example, a series of processes from step S102 to step S106.

In step S102, the controller 80 of the measurement apparatus 1 adjusts the position of the optical element so that a beam spot of the light L1 to be measured is disposed at the first position within the aperture formed in the optical element. For example, the controller 80 adjusts the position of the beam spot to the first position within the aperture by controlling a drive mechanism such as a motor attached to the optical element to move the optical element relative to the beam spot of the light L1 to be measured.

In the present disclosure, the "first position" includes, for example, a position shifted to one side in a predetermined direction from a reference position of the beam spot within the aperture. The "predetermined direction" includes, for example, a shortitudinal direction of the aperture formed in the optical element.

In step S103, the controller 80 of the measurement apparatus 1 measures a first spectrum when the beam spot of the light L1 to be measured is at the first position within the aperture formed in the optical element. The controller 80 acquires data on the first spectrum by a wavelength sweep by rotating the diffraction grating 11 of the spectroscope 10 around the rotation axis R.

In step S104, the controller 80 of the measurement apparatus 1 adjusts the position of the optical element so that the beam spot of the light L1 to be measured is disposed at the second position within the aperture formed in the optical element. For example, the controller 80 adjusts the position of the beam spot to the second position within the aperture by controlling the drive mechanism such as the motor attached to the optical element to move the optical element relative to the beam spot of the light L1 to be measured.

In the present disclosure, the "second position" includes, for example, a position shifted to the other side in the predetermined direction from the reference position of the beam spot within the aperture.

In step S105, the controller 80 of the measurement apparatus 1 measures a second spectrum when the beam spot of the light L1 to be measured is at the second position within the aperture formed in the optical element. The controller 80 acquires data on the second spectrum by a wavelength sweep by rotating the diffraction grating 11 of the spectroscope 10 around the rotation axis R.

In step S106, the controller 80 of the measurement apparatus 1 generates a synthetic spectrum of the narrowed light L1 to be measured by synthesizing the first spectrum measured in step S103 and the second spectrum measured in step S105. The synthetic spectrum is narrowed for each of the first spectrum and the second spectrum. The controller 80 acquires data on the narrowed synthetic spectrum by synthesizing the first spectrum and the second spectrum.

FIGS. 4A and 4B are first figures illustrating an example of the operations of the measurement apparatus 1 in FIG. 2. FIGS. 4A and 4B illustrate the relative relationship between the position of a beam spot P of the light L1 to be measured within an aperture 132a formed in the optical element and the position of the aperture 132a. FIG. 4A illustrates a first position x1 in step S102 of the flowchart in FIG. 3. FIG. 4B illustrates a second position x2 in step S104 of the flowchart in FIG. 3. In FIGS. 4A and 4B, Δx indicates the amount of displacement by which the optical element is shifted.

For example, as illustrated in FIG. 4A, the controller 80 shifts the position of the aperture 132$a$ by Δx by moving the optical element to the other side in a predetermined direction D, i.e., to the left, relative to the beam spot P of the light L1 to be measured. As a result, the position of the beam spot P within the aperture 132$a$ is relatively displaced from a reference position x0, which is a center position in the predetermined direction D, to the first position x1, which is shifted to one side in the predetermined direction D, i.e., to the right. The first position x1 includes, as an example, a center position of the beam spot P when a first end E1 of the beam spot P on the one side in the predetermined direction D contacts a first edge M1 of the aperture 132$a$.

For example, as illustrated in FIG. 4B, the controller 80 shifts the position of the aperture 132$a$ by Δx by moving the optical element to the one side in the predetermined direction D, i.e., to the right, relative to the beam spot P of the light L1 to be measured. As a result, the position of the beam spot P within the aperture 132$a$ is relatively displaced from the reference position x0, which is the center position in the predetermined direction D, to the second position x2, which is shifted to the other side in the predetermined direction D, i.e., to the left. The second position x2 includes, as an example, a center position of the beam spot P when a second end E2 of the beam spot P on the other side in the predetermined direction D contacts a second edge M2 of the aperture 132$a$.

As illustrated in FIGS. 4A and 4B, the controller 80 shifts the optical element relative to the beam spot P of the light L1 to be measured to both of the one side and the other side along the predetermined direction D by the same displacement amount Δx. Therefore, a first distance from the reference position x0 to the first position x1 and a second distance from the reference position x0 to the second position x2 both correspond to the displacement amount Δx, and are the same as each other.

The controller 80, for example, predetermines the first position x1 and the second position x2 by measurement before the first process is executed. The controller 80 calculates in advance the displacement amount Δx to shift the position of the aperture 132$a$ so that a periphery of the aperture 132$a$ does not overlap the beam spot P when the optical element is moved.

For example, when the width of the aperture 132$a$ along the predetermined direction D is 14 μm and the size of the beam spot P is 10 μm in diameter of a circle, the width of the aperture 132$a$ is 4 μm larger than the size of the beam spot P. Therefore, even if the position of the aperture 132$a$ is moved ±2 μm to the one side and the other side in the predetermined direction D, respectively, the beam spot P is not blocked by the optical element. Therefore, passage of the light L1 to be measured is not blocked and the peak intensity of data on the synthetic spectrum of the light L1 to be measured is not reduced. In this case, the controller 80 may set Δx=2 μm.

Before starting the execution of the first process, the controller 80, for example, executes a process of calculating an optimum Δx while measuring the intensity of a light spectrum. In the pre-process in step S101 of the flowchart in FIG. 3, the controller 80 calculates a first distance range in which the intensity of the light spectrum is maintained by shifting the position of the beam spot P within the aperture 132$a$ from the reference position x0 to the one side in the predetermined direction D in steps of a predetermined distance. The controller 80 determines the first position x1 based on the calculated first distance range.

Δx needs to be determined within a range in which the intensity of the optical spectrum of the light L1 to be measured does not decrease when the aperture 132$a$ is moved. Therefore, for example, the controller 80 measures an optical spectrum of any light while gradually varying Δx to 0 μm, 1 μm, 2 μm, . . . , in steps of a predetermined distance of 1 μm on the one side in the predetermined direction D, and calculates the range of Δx in which the peak intensity does not decrease, as the first distance range. As an example, the controller 80 calculates 0 μm<Δx≤2 μm, as the first distance range. The controller 80 calculates, as Δx, 2 μm, the largest value of the calculated first distance range, and determines the first position x1.

Similarly, in the pre-process, the controller 80 calculates a second distance range in which the intensity of the light spectrum is maintained by shifting the position of the beam spot P within the aperture 132$a$ from the reference position x0 to the other side in the predetermined direction D in steps of a predetermined distance. The controller 80 determines the second position x2 based on the calculated second distance range.

For example, the controller 80 measures an optical spectrum of any light while gradually varying Δx to 0 μm, 1 μm, 2 μm, . . . , in steps of a predetermined distance of 1 μm on the other side in the predetermined direction D, and calculates the range of Δx in which the peak intensity does not decrease, as the second distance range. As an example, the controller 80 calculates 0 μm<Δx≤2 μm, as the second distance range. The controller 80 calculates, as Δx, 2 μm, the largest value of the calculated second distance range, and determines the second position x2.

With reference to FIGS. 5A to 5D, an example when HeNe laser light with a wavelength of 1523 nm, which is single longitudinal mode laser light, is used as the light L1 to be measured as in FIGS. 13A to 13C, which illustrate the conventional technology, will be described below.

Figure 5A:
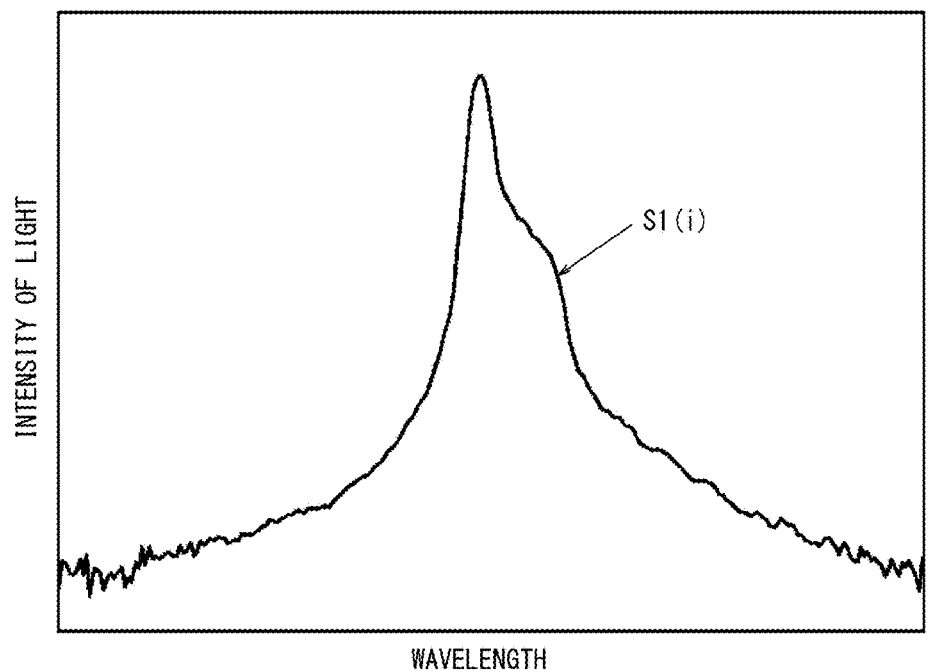
FIG. 5A is a second figure illustrating an example of the operation of the measurement apparatus in FIG. 2.

FIG. 5A is a second figure illustrating an example of the operation of the measurement apparatus 1 in FIG. 2. FIG. 5A illustrates an example of a first spectrum S1($i$) of the light L1 to be measured, which is measured in step S103 of the flowchart in FIG. 3. Here, i represents the number of sampled measurement points. In FIG. 5A, the horizontal axis represents wavelength at each measurement point i. The vertical axis represents light intensity at each measurement point i. The same applies to the graphs in each of the following figures.

The controller 80 acquires data on the first spectrum S1($i$) by a wavelength sweep by rotating the diffraction grating 11 of the spectroscope 10. The first spectrum S1($i$) has an asymmetrical waveform, as illustrated in FIG. 5A. Compared to the measurement spectrum S(i) of the light to be measured based on the conventional technology illustrated in FIG. 12, the first spectrum S1($i$) is sharp with a wide dynamic range on the short wavelength side of a peak, but is blunt with a reduced dynamic range on the long wavelength side.

This is because the position of the aperture 132$a$ is shifted to the other side by the displacement amount Δx. On one side of the beam spot P, the same effect as when the slit width w is narrowed is obtained, and the dynamic range is improved. On the other hand, on the other side of the beam spot P, the same effect as when the slit width w is widened is obtained, and the dynamic range is decreased.

Figure 5B:
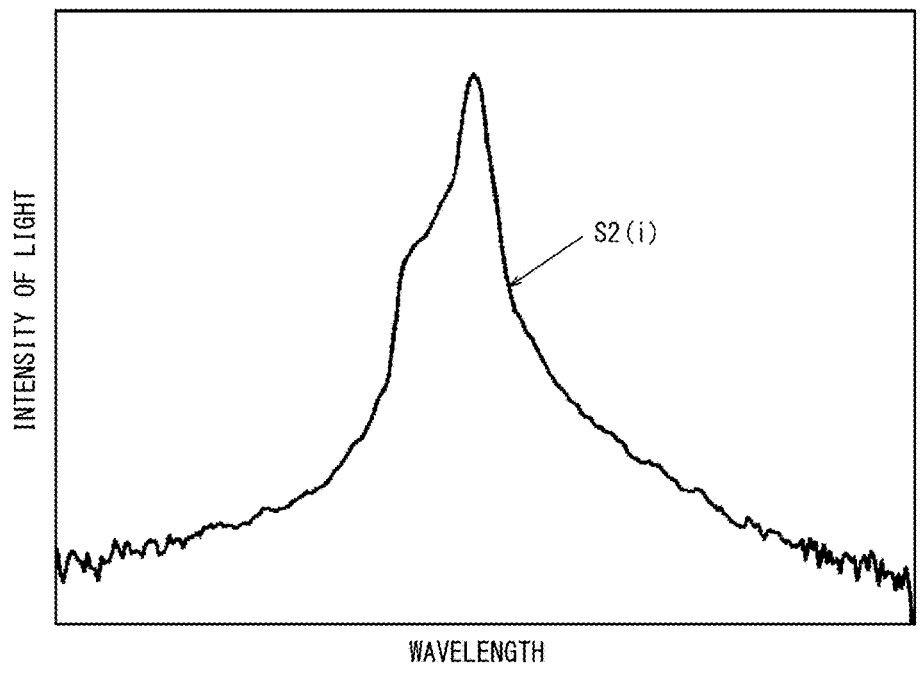
FIG. 5B is a third figure illustrating an example of the operation of the measurement apparatus in FIG. 2.

FIG. 5B is a third figure illustrating an example of the operation of the measurement apparatus 1 in FIG. 2. FIG. 5B illustrates an example of a second spectrum S2(i) of the light L1 to be measured, which is measured in step S105 of the flowchart in FIG. 3.

The controller 80 acquires data on the second spectrum S2(i) by a wavelength sweep by rotating the diffraction grating 11 of the spectroscope 10. The second spectrum S2(i) has an asymmetrical waveform, as illustrated in FIG. 5B. Compared to the measurement spectrum S(i) of the light to be measured based on the conventional technology illustrated in FIG. 12, the second spectrum S2(i) is blunt with a reduced dynamic range on the short wavelength side of a peak, but is sharp with a wide dynamic range on the long wavelength side.

This is because the position of the aperture 132a is shifted to the one side by the displacement amount $\Delta x$. On the other side of the beam spot P, the same effect as when the slit width w is narrowed is obtained, and the dynamic range is improved. On the other hand, on the one side of the beam spot P, the same effect as when the slit width w is widened is obtained, and the dynamic range is decreased.

Figure 5C:
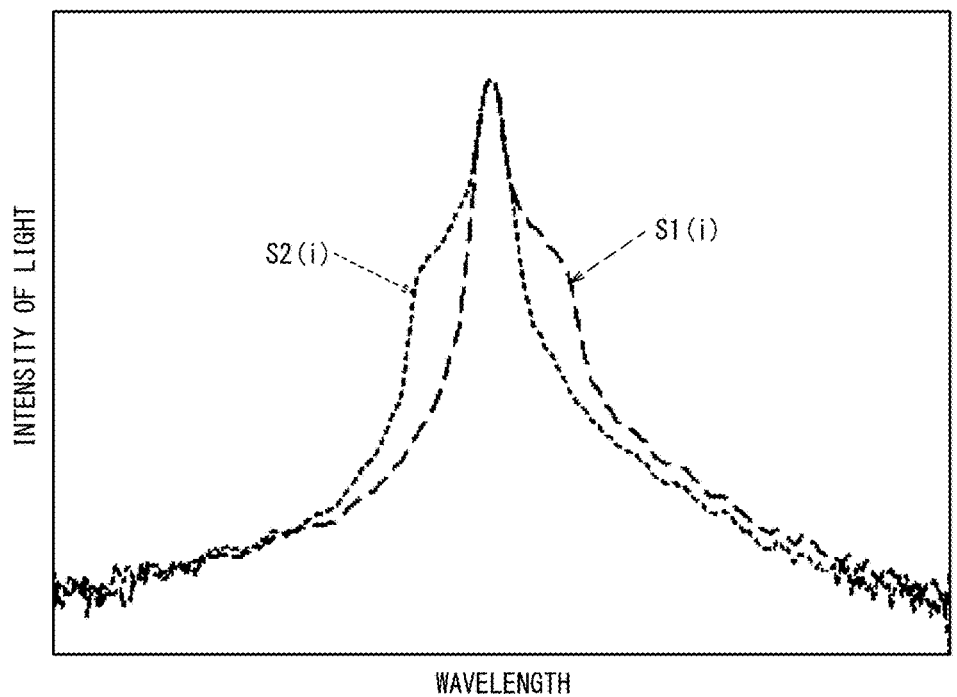
FIG. 5C is a fourth figure illustrating an example of the operation of the measurement apparatus in FIG. 2.

FIG. 5C is a fourth figure illustrating an example of the operation of the measurement apparatus 1 in FIG. 2. FIG. 5C conceptually illustrates a synthesis process in step S106 of the flowchart in FIG. 3.

The controller 80 synthesizes the first spectrum S1(i) and the second spectrum S2(i), and generates, as a measurement result, a synthetic spectrum of the light L1 to be measured. In this case, the controller 80 generates the synthetic spectrum using a spectrum, between the first spectrum S1(i) and the second spectrum S2(i), with lower intensity at each measurement point i.

For example, on the short wavelength side of the peak of the optical spectrum, the intensity of the first spectrum S1(i) tends to be lower than that of the second spectrum S2(i), so the first spectrum S1(i) tends to be used. Conversely, on the long wavelength side of the peak of the optical spectrum, the intensity of the second spectrum S2(i) tends to be lower than that of the first spectrum S1(i), so the second spectrum S2(i) tends to be used.

Figure 5D:
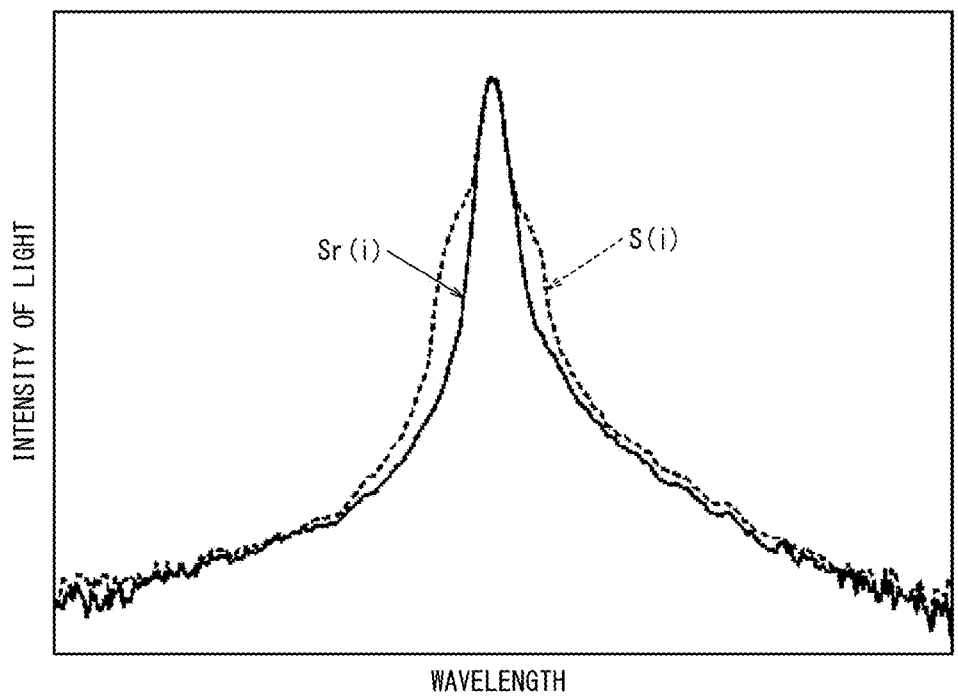
FIG. 5D is a fifth figure illustrating an example of the operation of the measurement apparatus in FIG. 2.

FIG. 5D is a fifth figure illustrating an example of the operation of the measurement apparatus 1 in FIG. 2. FIG. 5D illustrates a comparison between a synthetic spectrum Sr(i) of the light L1 to be measured that is obtained based on the synthesis process in step S106 of the flowchart in FIG. 3 and the measurement spectrum S(i) based on the conventional technology.

As the result of synthesizing the first spectrum S1(i) and the second spectrum S2(i) based on the first process illustrated in the flowchart in FIG. 3, the synthetic spectrum Sr(i) is obtained. As illustrated in FIG. 5D, the synthetic spectrum Sr(i) is sharper in the vicinity of the peak and exhibits a wider dynamic range compared to the measurement spectrum S(i) based on the conventional technology. The controller 80 of the measurement apparatus 1 acquires data on the synthetic spectrum Sr(i) with the wide dynamic range based on the first spectrum S1(i) and the second spectrum S2(i).

Figure 6:
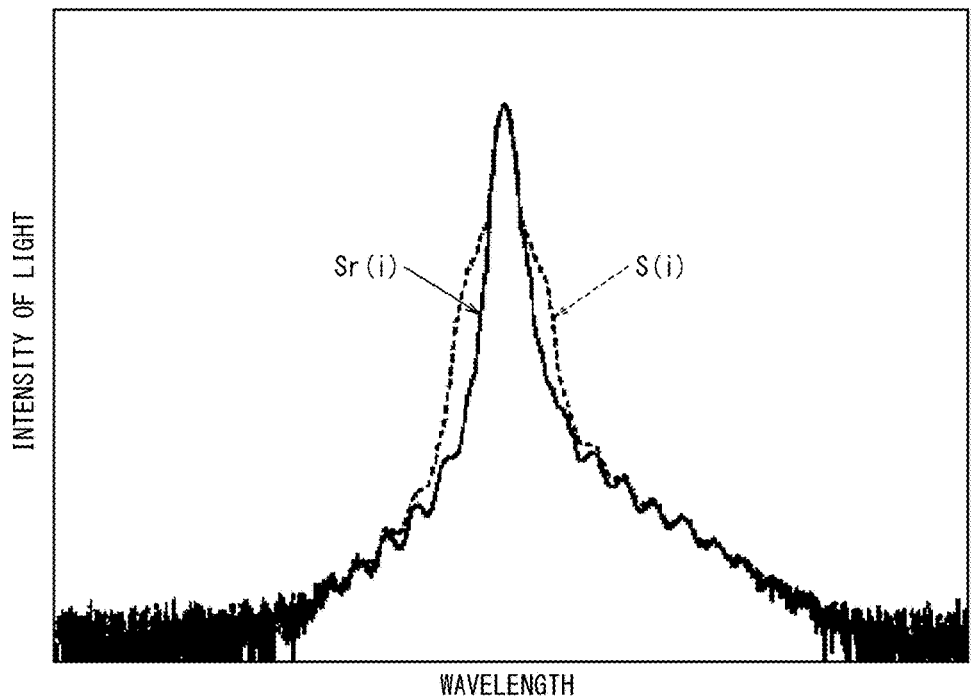
FIG. 6 is a sixth figure illustrating an example of the operation of the measurement apparatus in FIG. 2.

With reference to FIG. 6, an example when laser light emitted from an external resonator tunable laser source (TLS), which is different from the laser light used in the example illustrated in FIGS. 5A to 5D, is used as the light L1 to be measured will be described below.

FIG. 6 is a sixth figure illustrating an example of the operation of the measurement apparatus 1 in FIG. 2. FIG. 6 illustrates a comparison between a synthetic spectrum Sr(i) of the light L1 to be measured that is obtained based on the synthesis process in step S106 of the flowchart in FIG. 3 and a measurement spectrum S(i) based on the conventional technology.

The optical spectrum of the laser light emitted from the TLS has, in addition to a main mode peak with high intensity, multiple side mode peaks with low intensity on both sides in its wavelength range. The synthetic spectrum Sr(i) obtained based on the first process is sharper in the vicinity of the main mode peak and exhibits a wide dynamic range, as compared to the measurement spectrum S(i) based on the conventional technology. In addition, when focusing on the side mode peaks on the short wavelength side of the main mode peak, the synthetic spectrum Sr(i) exhibits the shape of peaks and valleys of the side modes more clearly than the measurement spectrum S(i) based on the conventional technology.

As is understood from the example illustrated in FIG. 6, data on the sharp synthetic spectrum Sr(i) with a wider dynamic range than the measurement spectrum S(i) by the conventional technology is obtained based on the measurement method according to the embodiment.

In addition to the above processes based on the flowchart in FIG. 3, the controller 80 may switch between the above first process and a second process in which a reference spectrum of the light L1 to be measured is measured at the reference position x0, in response to a user's selection input using the input interface 60. The reference spectrum of the light L1 to be measured corresponds to, for example, the measurement spectrum S(i) based on the conventional technology measured when the beam spot 103 is disposed at the center position of the slit 102.

The controller 80 may be able to switch between acquiring data on the reference spectrum measured in one wavelength sweep and acquiring data on the synthetic spectrum measured in two wavelength sweeps, based on the user's input operation using the input interface 60, according to a measurement time desired by the user. The controller 80 may execute one of the measurement process based on the conventional technology or the measurement process according to the measurement method of the embodiment, in response to the user's selection.

Figure 7:
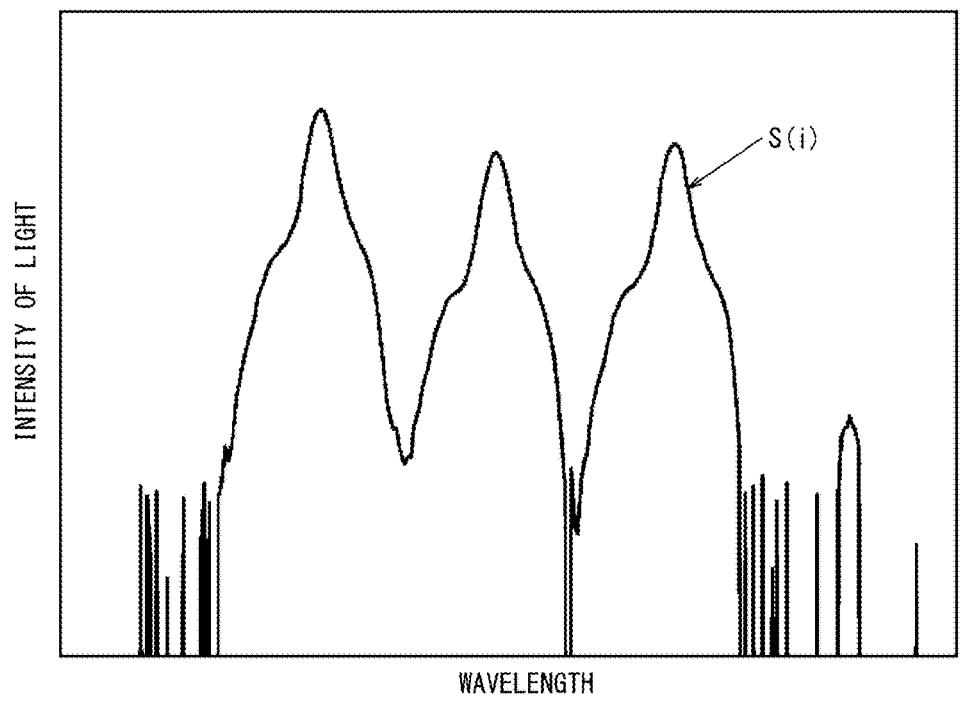
FIG. 7 is a seventh figure illustrating an example of the operation of the measurement apparatus in FIG. 2.
Figure 8A:
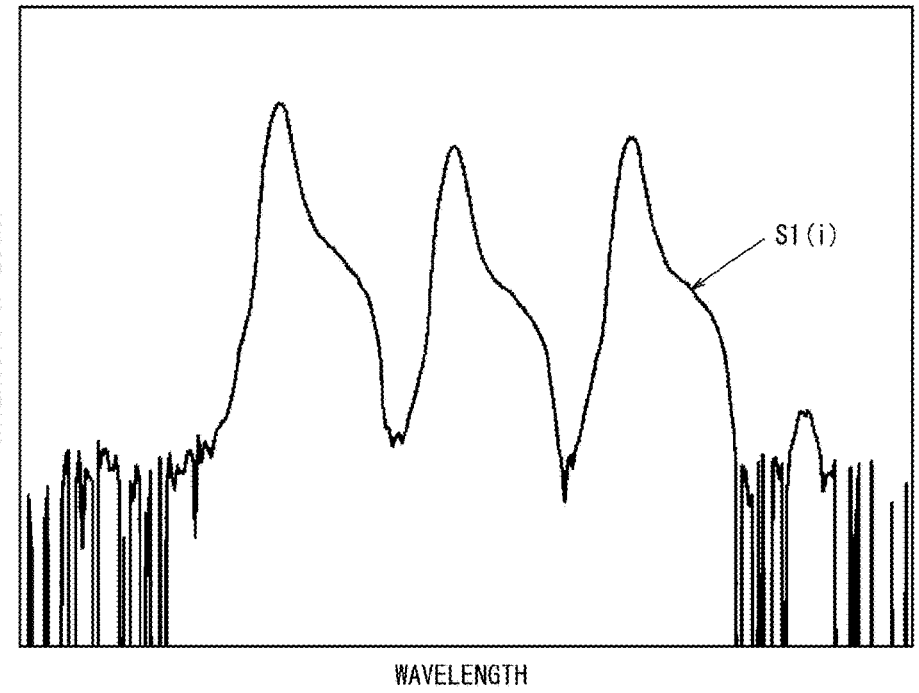
FIG. 8A is an eighth figure illustrating an example of the operation of the measurement apparatus in FIG. 2.
Figure 8B:
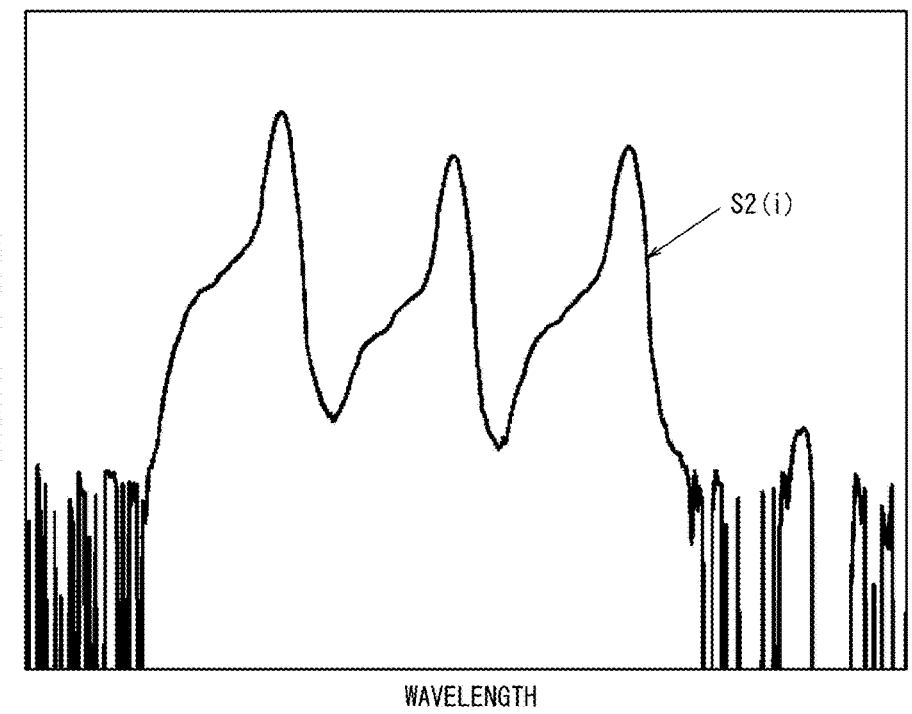
FIG. 8B is a ninth figure illustrating an example of the operation of the measurement apparatus in FIG. 2.
Figure 8C:
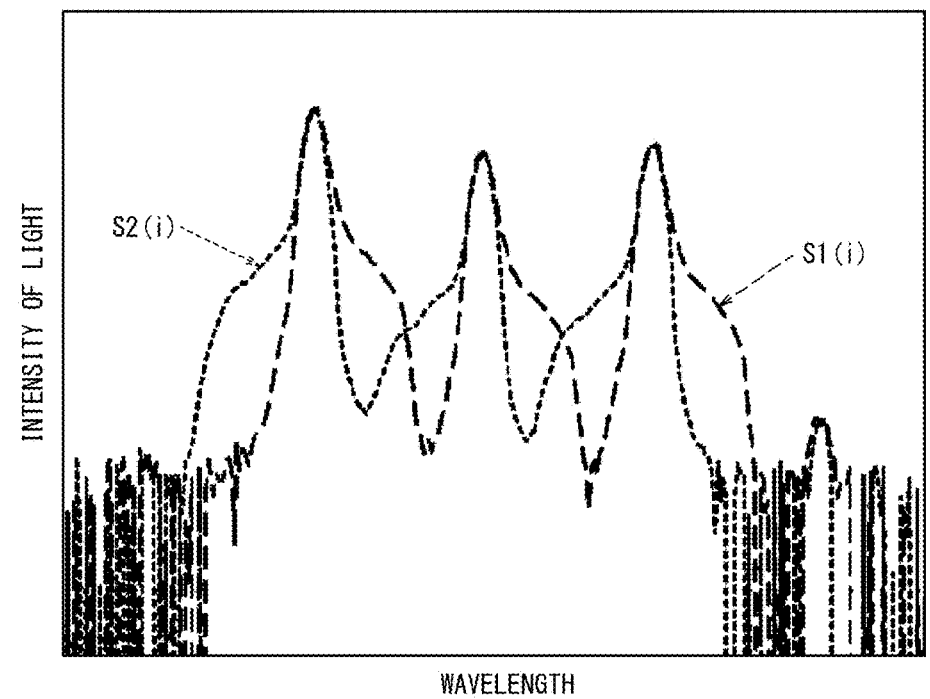
FIG. 8C is a tenth figure illustrating an example of the operation of the measurement apparatus in FIG. 2.
Figure 8D:
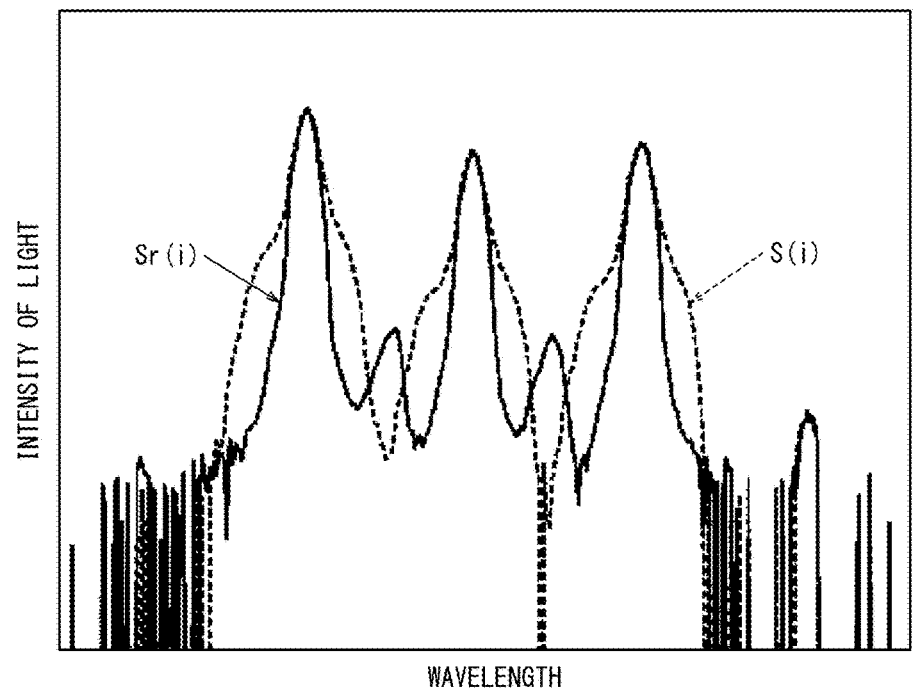
FIG. 8D is an eleventh figure illustrating an example of the operation of the measurement apparatus in FIG. 2.

With reference to FIGS. 7 to 8D, an example when laser light emitted from a laser diode pumped solid-state (DPSS) laser is used as the light L1 to be measured will be described.

FIG. 7 is a seventh figure illustrating an example of the operation of the measurement apparatus 1 in FIG. 2. FIG. 7 illustrates a measurement example when a measurement spectrum S(i) of the light L1 to be measured from the DPSS laser is acquired based on the conventional technology. In this measurement example, the measurement spectrum S(i) exhibits three large peaks with different wavelengths. Each peak is connected to other adjacent peaks at its hems and is close to the other peaks.

FIG. 8A is an eighth figure illustrating an example of the operation of the measurement apparatus 1 in FIG. 2. FIG. 8A corresponds to FIG. 5A and illustrates an example of a first spectrum S1(i) of the light L1 to be measured that is measured in step S103 of the flowchart in FIG. 3. The same details as described above using FIG. 5A also apply to the first spectrum S1(i) illustrated in FIG. 8A.

FIG. 8B is a ninth figure illustrating an example of the operation of the measurement apparatus 1 in FIG. 2. FIG. 8B corresponds to FIG. 5B and illustrates an example of a second spectrum S2(i) of the light L1 to be measured that is measured in step S105 of the flowchart in FIG. 3. The same details as described above using FIG. 5B also apply to the second spectrum S2(i) illustrated in FIG. 8B.

FIG. 8C is a tenth figure illustrating an example of the operation of the measurement apparatus 1 in FIG. 2. FIG. 8C corresponds to FIG. 5C and conceptually illustrates the synthesis process in step S106 of the flowchart in FIG. 3. The same details as described above using FIG. 5C also apply to the synthesis process in the example of FIG. 8C.

FIG. 8D is an eleventh figure illustrating an example of the operation of the measurement apparatus 1 in FIG. 2. FIG. 8D corresponds to FIG. 5D and illustrates a comparison between a synthetic spectrum Sr(i) of the light L1 to be measured that is obtained based on the synthesis process in step S106 of the flowchart in FIG. 3 and the measurement spectrum S(i) based on the conventional technology.

As the result of synthesizing the first spectrum $S1(i)$ and the second spectrum $S2(i)$ based on the first process illustrated in the flowchart in FIG. 3, the synthetic spectrum Sr(i) is obtained. As illustrated in FIG. 8D, the synthetic spectrum Sr(i) is sharper in the vicinities of the peaks and exhibits a wider dynamic range compared to the measurement spectrum S(i) based on the conventional technology. However, the synthetic spectrum Sr(i) exhibits local peaks, which are not seen in the measurement spectrum S(i) measured with the conventional technology, in the valleys of the three peaks.

As described above, when an optical spectrum with only one peak is measured, no local peak occurs in a synthetic spectrum Sr(i). However, when an optical spectrum with multiple peaks adjacent to each other is measured, a local peak may occur in a synthetic spectrum Sr(i). The local peak is not originally included in the laser light to be measured from the DPSS laser. Therefore, the occurrence of the local peak is undesirable as measurement data.

A process of the measurement system 1 to deal with the local peak that has occurred in the synthetic spectrum Sr(i) will be mainly described below.

FIG. 9 is a flowchart illustrating a second example of the operations of the measurement apparatus 1 in FIG. 2. With reference to FIG. 9, a second example of the measurement method executed by the measurement apparatus 1 of FIG. 2 will be mainly described. Processes from step S201 to step S206 of FIG. 9 are the same as those from step S101 to step S106 of FIG. 3, respectively. In the example illustrated in FIG. 9, for example, the first process includes a series of processes from step S202 to step S210.

In step S207, the controller 80 of the measurement apparatus 1 determines whether a local peak has occurred between a pair of peaks adjacent to each other in the synthetic spectrum Sr(i) when the first spectrum $S1(i)$ and the second spectrum $S2(i)$ have been synthesized in step S206. Upon determining that a local peak has occurred, the controller 80 performs the process of step S208. Upon determining that no local peak has occurred, the controller 80 terminates the processes.

Upon determining in step S207 that a local peak has occurred, in step S208, the controller 80 of the measurement apparatus 1 adjusts the position of the optical element so that the beam spot P of the light L1 to be measured is disposed at the reference position x0 within the aperture 132a formed in the optical element. For example, the controller 80 adjusts the position of the beam spot P within the aperture 132a to the reference position x0 by moving the optical element relative to the beam spot P of the light L1 to be measured by controlling the drive mechanism such as the motor attached to the optical element.

In step S209, the controller 80 of the measurement apparatus 1 measures a third spectrum when the beam spot P of the light L1 to be measured is at the reference position x0 within the aperture 132a formed in the optical element. The controller 80 acquires data on the third spectrum by a wavelength sweep by rotating the diffraction grating 11 of the spectroscope 10 around the rotation axis R.

In step S210, the controller 80 of the measurement apparatus 1 generates the synthetic spectrum Sr(i) of the light L1 to be measured by synthesizing the first spectrum $S1(i)$ and the second spectrum $S2(i)$ plus the third spectrum measured in step S209. The controller 80 acquires data on the synthetic spectrum Sr(i) of the light L1 to be measured, in which the third spectrum is also synthesized in addition to the first spectrum $S1(i)$ and the second spectrum $S2(i)$.

Figure 10A:
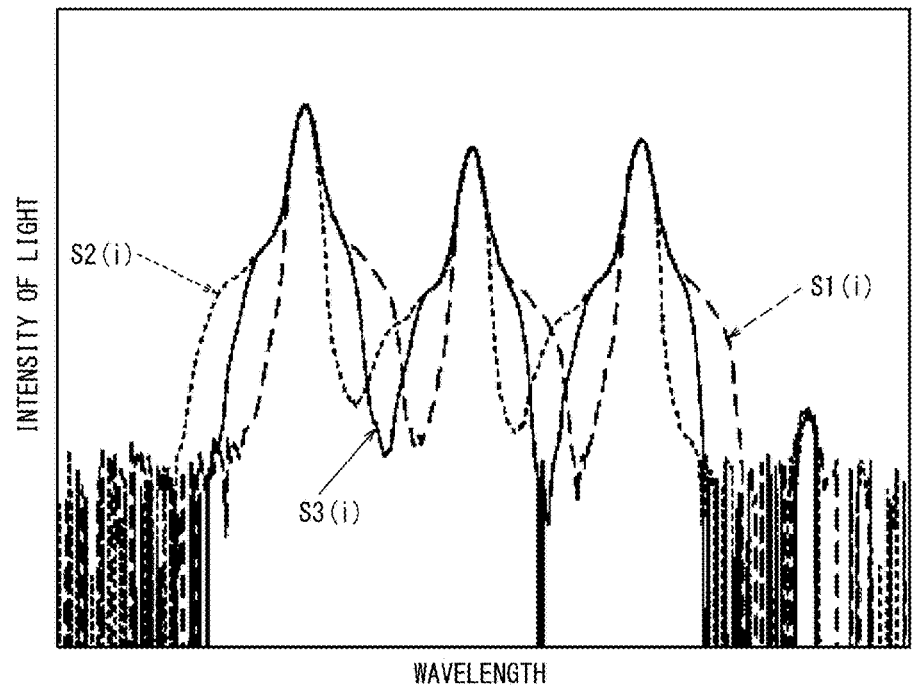
FIG. 10A is a twelfth figure illustrating an example of the operation of the measurement apparatus in FIG. 2.

FIG. 10A is a twelfth figure illustrating an example of the operation of the measurement apparatus 1 in FIG. 2. FIG. 10A conceptually illustrates the synthesis process in step S210 of the flowchart in FIG. 9.

The controller 80 synthesizes a third spectrum $S3(i)$, in addition to the first spectrum $S1(i)$ and the second spectrum $S2(i)$, to generate the synthetic spectrum Sr(i) of the light L1 to be measured, as a measurement result. At this time, the controller 80 generates the synthetic spectrum Sr(i) using a spectrum, among the first spectrum $S1(i)$, the second spectrum $S2(i)$, and the third spectrum $S3(i)$, with the lowest intensity at each measurement point i.

For example, on the short wavelength sides of the peaks of the optical spectrum, the intensity of the first spectrum $S1(i)$ tends to be the lowest, so the first spectrum $S1(i)$ tends to be used. Conversely, on the long wavelength sides of the peaks of the optical spectrum, the intensity of the second spectrum $S2(i)$ tends to be the lowest, so the second spectrum $S2(i)$ tends to be used. In wavelength ranges corresponding to the local peaks, the intensity of the third spectrum $S3(i)$ tends to be the lowest, so the third spectrum $S3(i)$ tends to be used.

Figure 10B:
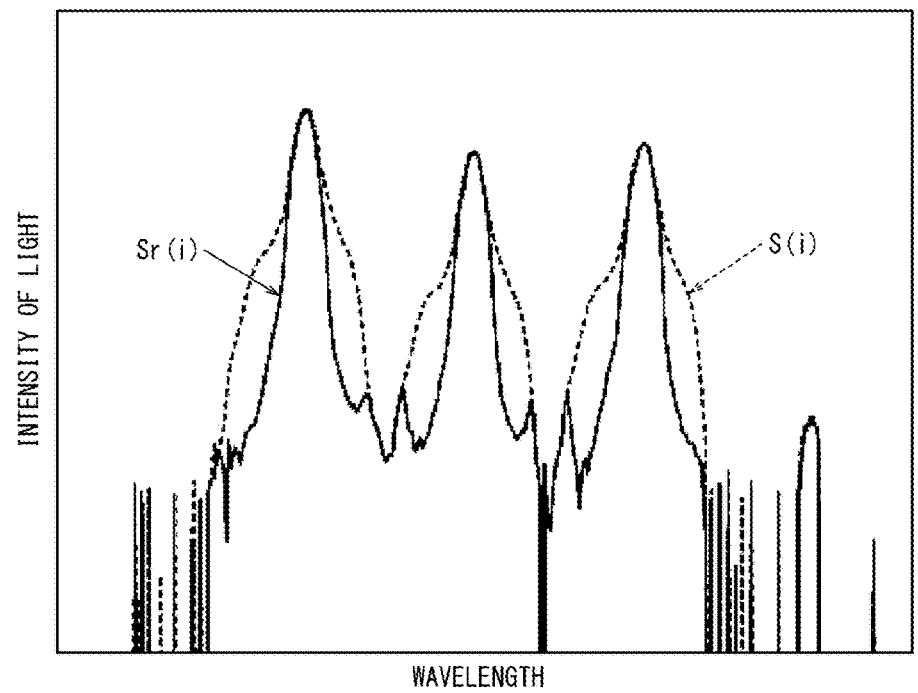
FIG. 10B is a thirteenth figure illustrating an example of the operation of the measurement apparatus in FIG. 2.

FIG. 10B is a thirteenth figure illustrating an example of the operation of the measurement apparatus 1 in FIG. 2. FIG. 10B illustrates a comparison between the synthetic spectrum Sr(i) of the light L1 to be measured that is obtained based on the synthesis process in step S210 of the flowchart in FIG. 9 and the measurement spectrum S(i) based on the conventional technology.

As the result of synthesizing the first spectrum $S1(i)$, the second spectrum $S2(i)$, and the third spectrum $S3(i)$ based on the first process illustrated in the flowchart in FIG. 9, the synthetic spectrum Sr(i) is obtained. As illustrated in FIG. 10B, the synthetic spectrum Sr(i) is sharper in the vicinities of the peaks and exhibits a wider dynamic range, as compared to the measurement spectrum S(i) based on the conventional technology. In addition, in the synthetic spectrum Sr(i), the local peaks as illustrated in FIG. 8D are reduced.

According to the measurement apparatus 1 of the embodiment as described above, it is possible to improve the dynamic range for the synthetic spectrum Sr(i) of the light L1 to be measured. The measurement apparatus 1 executes the first process to generate the synthetic spectrum Sr(i) by synthesizing at least the first spectrum $S1(i)$ and the second spectrum $S2(i)$. This allows the measurement apparatus 1 to acquire data on the synthetic spectrum Sr(i) that is sharp with a wide dynamic range, as in a case in which the slit width w is the same as the ideal spot size s.

In addition, the measurement apparatus 1 can improve the dynamic range by devising the measurement process without changing the size of the aperture 132a formed in the optical element. This allows optical spectrum analyzers that have already been shipped to the market to improve the dynamic range by updating firmware without changing hardware.

The measurement apparatus 1 generates the synthetic spectrum Sr(i) using a spectrum, between the first spectrum S1(i) and the second spectrum S2(i), with lower intensity at each measurement point i. Therefore, the measurement apparatus 1 can generate the synthetic spectrum Sr(i) narrowed for each of the first spectrum S1(i) and the second spectrum S2(i).

The measurement apparatus 1 executes the pre-process to predetermine, by measurement, at least one of the first position x1 or the second position x2 before the first process is executed. Therefore, the measurement apparatus 1 can measure the first spectrum S1(i) and the second spectrum S2(i) with high accuracy in the first process.

In the pre-process, the measurement apparatus 1 calculates the first distance range in which the intensity of the optical spectrum is maintained by shifting the position of the beam spot P from the reference position x0 to the one side in steps of the predetermined distance, and determines the first position x1 based on the first distance range. Therefore, the measurement apparatus 1 can determine the first position x1 with high accuracy.

In the pre-process, the measurement apparatus 1 calculates the second distance range in which the intensity of the optical spectrum is maintained by shifting the position of the beam spot P from the reference position x0 to the other side in steps of the predetermined distance, and determines the second position x2 based on the second distance range. Therefore, the measurement apparatus 1 can determine the second position x2 with high accuracy.

In the first process, the measurement apparatus 1 determines whether a local peak has occurred between a pair of peaks adjacent to each other in the synthetic spectrum Sr(i) when the first spectrum S1(i) and the second spectrum S2(i) are synthesized. Thereby, the measurement apparatus 1 can also deal with the local peak that is not originally included in laser light to be measured and is undesirable as measurement data. For example, the measurement apparatus 1 can also execute the arithmetic process to reduce such a local peak.

Upon determining that a local peak has occurred, the measurement apparatus 1 generates the synthetic spectrum Sr(i) by synthesizing, in addition to the first spectrum S1(i) and the second spectrum S2(i), the third spectrum S3(i) when the beam spot P is at the reference position x0. Therefore, the measurement apparatus 1 can generate the sharp synthetic spectrum Sr(i) with a wide dynamic range while preventing the occurrence of the local peak.

Upon determining that no local peak has occurred, the measurement apparatus 1 omits the process associated with the third spectrum S3(i), thereby making it possible to measure the synthetic spectrum Sr(i) in two wavelength sweeps in a case in which no local peak has occurred. Therefore, the measurement apparatus 1 can shorten a measurement time.

The measurement apparatus 1 generates the synthetic spectrum Sr(i) using a spectrum, among the first spectrum S1(i), the second spectrum S2(i), and the third spectrum S3(i), with the lowest intensity at each measurement point i. Therefore, the measurement apparatus 1 can generate the synthetic spectrum Sr(i) narrowed for each of the first spectrum S1(i), the second spectrum S2(i), and the third spectrum S3(i) while preventing the occurrence of the local peak.

The measurement apparatus 1 switches between the first process and the second process in which the reference spectrum of the light L1 to be measured is measured at the reference position x0, in response to the user's selection input. Thereby, the measurement apparatus 1 allows the user to select whether to prefer an improved dynamic range by the synthetic spectrum Sr(i) or to prefer a shorter measurement time by the reference spectrum at a reduced dynamic range. The user can also have the measurement apparatus 1 acquire data on the reference spectrum when aiming at shortening the measurement time rather than the improved dynamic range, and have the measurement apparatus 1 acquire data on the synthetic spectrum Sr(i) when aiming at improving the dynamic range. Therefore, the convenience of the measurement apparatus 1 is improved.

The measurement apparatus 1 can improve the symmetry of a waveform with respect to the synthetic spectrum Sr(i) by having the reference position x0 include the center position of the aperture 132a in the predetermined direction D.

The measurement apparatus 1 can eliminate, using the optical element, stray light mixed around the beam spot P along the shortitudinal direction, by having the predetermined direction D include the shortitudinal direction of the aperture 132a. The measurement apparatus 1 can prevent the influence of stray light mixed in such a shortitudinal direction on the synthetic spectrum Sr(i).

The measurement apparatus 1 can improve the symmetry of a waveform with respect to the synthetic spectrum Sr(i) by having the first distance from the reference position x0 to the first position x1 and the second distance from the reference position x0 to the second position x2 the same as each other.

The first position x1 includes the center position of the beam spot P when the first end E1 contacts the first edge M1 of the aperture 132a. Therefore, the measurement apparatus 1 can remove, using the optical element with the aperture 132a, the most stray light mixed on the one side in the predetermined direction D with respect to the beam spot P.

The second position x2 includes the center position of the beam spot P when the second end E2 contacts the second edge M2 of the aperture 132a. Therefore, the measurement apparatus 1 can remove, using the optical element with the aperture 132a, the most stray light mixed on the other side in the predetermined direction D with respect to the beam spot P.

It is obvious to those skilled in the art that the present disclosure can be realized in forms other than the embodiment described above without departing from its spirit or its essential features. Accordingly, the preceding description is illustrative and not limiting. The scope of the disclosure is defined by the appended claims, not by the preceding description. Some of any modifications, which are within the scope of their equivalents, are assumed to be encompassed therein.

For example, the shape, pattern, size, arrangement, orientation, type, and number of each component described above are not limited to those illustrated in the above description and drawings. The shape, pattern, size, arrangement, orientation, type, and number of each component may be configured arbitrarily, as long as the functions can be realized. Each component of the measurement apparatus 1 illustrated in the drawings is a functional concept, and the specific form of each component is not limited to that illustrated in the drawings.

The functions or the like included in each component, step, or the like described above can be rearranged in a logically consistent manner, and multiple components, steps, or the like can be combined into one or divided.

For example, it is possible to make a general purpose electronic device, such as a smartphone or a computer, function as the measurement apparatus 1 according to the embodiment described above. Specifically, a program describing processing contents to realize the functions of the measurement apparatus 1 according to the embodiment is stored in a memory of the electronic device, and is read and executed by a processor of the electronic device. Thus, the present disclosure can also be realized as a program that can be executed by a processor.

Alternatively, the present disclosure can also be realized as a non-transitory computer readable medium storing a program that is executable by one or more processors to cause the measurement apparatus 1 or the like according to the embodiment to perform each function. It is to be understood that the scope of the present disclosure also includes this.

In the above embodiment, the measurement apparatus 1 is described as generating the synthetic spectrum Sr(i) of the narrowed light L1 to be measured by synthesizing the two or three spectra, but is not limited to this. The measurement apparatus 1 may generate the synthetic spectrum Sr(i) of the narrowed light L1 to be measured by synthesizing four or more spectra, as long as the measurement apparatus 1 synthesizes at least the first spectrum $S1(i)$ at the first position x1 and the second spectrum $S2(i)$ at the second position x2.

In the above embodiment, the measurement apparatus 1 is described as generating the synthetic spectrum Sr(i) using a spectrum, between the first spectrum $S1(i)$ and the second spectrum $S2(i)$, with lower intensity at each measurement point i, but is not limited to this. The measurement apparatus 1 may execute any other arithmetic process capable of generating the narrowed synthetic spectrum Sr(i) by synthesizing at least the first spectrum $S1(i)$ and the second spectrum $S2(i)$.

In the above embodiment, the measurement apparatus 1 is described as executing the pre-process to predetermine, by measurement, at least one of the first position x1 or the second position x2 before the first process is executed, but is not limited to this. The measurement apparatus 1 may predetermine at least one of the first position x1 or the second position x2 based on input information from the user using the input interface 60, provided that the user knows in advance exact values for the size of the beam spot P and the width of the aperture 132a.

In the above embodiment, the measurement apparatus 1 is described as calculating, as Δx, the largest value in the calculated first distance range and determining the first position x1, but is not limited to this. The measurement apparatus 1 may calculate, as Δx, any other value in the calculated first distance range and determine the first position x1.

In the above embodiment, the measurement apparatus 1 is described as calculating, as Δx, the largest value in the calculated second distance range and determining the second position x2, but is not limited to this. The measurement apparatus 1 may calculate, as Δx, any other value in the calculated second distance range and determine the second position x2.

In the above embodiment, the measurement apparatus 1 is described as, in the first process, determining whether a local peak has occurred between a pair of peaks adjacent to each other in the synthetic spectrum Sr(i) when the first spectrum $S1(i)$ and the second spectrum $S2(i)$ are synthesized, but is not limited to this. The measurement apparatus 1 does not have to execute such a determination process. For example, the measurement apparatus 1 may or may not execute the process associated with the third spectrum $S3(i)$ regardless of whether a local peak has occurred.

In the above embodiment, the measurement apparatus 1 is described as generating the synthetic spectrum Sr(i) by synthesizing the third spectrum $S3(i)$ in addition to the first spectrum $S1(i)$ and the second spectrum $S2(i)$ when a local peak is determined to have occurred, but is not limited to this. The measurement apparatus 1 may execute any other process instead of or in addition to such a process as synthesizing the third spectrum $S3(i)$ as described above, with respect to addressing the local peak occurring in the synthetic spectrum Sr(i).

For example, upon determining that a local peak has occurred, the controller 80 of the measurement apparatus 1 may display the local peak in a different manner from other portions. For example, when displaying the data on the synthetic spectrum Sr(i) on the output interface 70, the controller 80 may display the local peak in the synthetic spectrum Sr(i) in a different color, thickness, and line type from other portions on the output interface 70. This allows the measurement apparatus 1 to clearly indicate, to the user, the position of the local peak in the synthetic spectrum Sr(i). The user can easily determine which portion in the measured synthetic spectrum Sr(i) is the local peak.

For example, upon determining that the local peak has occurred, the controller 80 of the measurement apparatus 1 may perform an interpolation process based on data on both sides of the local peak and update optical spectrum data at the local peak. The interpolation process may include spline interpolation and interpolation that simply connects two points with a straight line. This allows the measurement apparatus 1 to reduce the local peak in the synthetic spectrum Sr(i), in the same manner as when the process associated with the third spectrum $S3(i)$ is executed.

At this time, the controller 80 of the measurement apparatus 1 may display a portion for which data has been updated in the synthetic spectrum Sr(i) in a different manner from other portions. For example, when displaying the data on the synthetic spectrum Sr(i) on the output interface 70, the controller 80 may display the portion with the updated data in the synthetic spectrum Sr(i) in a different color, thickness, and line type than the other portions. This allows the measurement apparatus 1 to clearly indicate, to the user, the position of the portion for which data has been updated in the synthetic spectrum Sr(i). The user can easily determine the portion for which data has been updated in the measured synthetic spectrum Sr(i).

For example, upon determining that a local peak has occurred, the controller 80 of the measurement apparatus 1 may switch to the second process in which the reference spectrum of the light L1 to be measured is measured at the reference position x0. Upon determining that a local peak has occurred, the controller 80 may automatically switch from the first process to the second process. This allows the measurement apparatus 1 to acquire optical spectrum data on the light L1 to be measured based on the reference spectrum that exhibits no local peaks.

In the above embodiment, the measurement apparatus 1 is described as generating the synthetic spectrum Sr(i) using a spectrum, among the first spectrum $S1(i)$, the second spectrum $S2(i)$, and the third spectrum $S3(i)$, with the lowest intensity at each measurement point i, but is not limited to this. The measurement apparatus 1 may execute any other arithmetic process capable of generating the narrowed synthetic spectrum Sr(i) by synthesizing the first spectrum S1(i), the second spectrum S2(i), and the third spectrum S3(i).

In the above embodiment, the measurement apparatus 1 is described as switching between and executing either the first process and the second process in which the reference spectrum of the light L1 to be measured is measured at the reference position x0, in response to the user's selection input, but is not limited to this. The measurement apparatus 1 may execute only the first process without executing the second process, and may not enable such selection.

In the above embodiment, the reference position x0 is described as including the center position of the aperture 132a in the predetermined direction D, but is not limited to this. The reference position x0 may include any other position of the aperture 132a in the predetermined direction D.

In the above embodiment, the predetermined direction D is described as including the shortitudinal direction of the aperture 132a, but is not limited to this. The predetermined direction D may include any other direction, such as a longitudinal direction or a diagonal direction of the aperture 132a.

In the above embodiment, the first distance from the reference position x0 to the first position x1 and the second distance from the reference position x0 to the second position x2 are described as being the same as each other, but is not limited to this. The first distance and the second distance may be different from each other.

In the above embodiment, the first position x1 is described as including the center position of the beam spot P when the first end E1 of the beam spot P on the one side contacts the first edge M1 of the aperture 132a, but is not limited to this. The first position x1 may include the center position of the beam spot P when the first end E1 is away from the first edge M1.

In the above embodiment, the second position x2 is described as including the center position of the beam spot P when the second end E2 of the beam spot P on the other side contacts the second edge M2 of the aperture 132a, but is not limited to this. The second position x2 may include the center position of the beam spot P when the second end E2 is away from the second edge M2.

In the above embodiment, the spectroscope 10 is configured based on a two-stage multipath system, but is not limited to this. The spectroscope 10 may be configured based on a three or more-stage multipath system. Accordingly, the "optical element" described in the claims is not limited to the second optical element 132, but may correspond to any other optical element disposed at any position in the spectroscope 10 to block stray light.

In the above embodiment, the measurement apparatus 1 is described as moving the optical element to execute the position adjustment to the reference position x0, the first position x1, and the second position x2, which indicate the position of the beam spot P within the aperture 132a, but is not limited to this. The measurement apparatus 1 may execute the position adjustment by moving the beam spot P while the optical element is fixed, or may execute the position adjustment by moving both the optical element and the beam spot P.

Some embodiments of the present disclosure will be illustrated below. However, embodiments of the present disclosure are not limited to these.

Appendix 1

A measurement apparatus comprising:
a controller; and
a spectroscope having an optical element in which an aperture to pass light to be measured is formed,
wherein
the controller is configured to execute a first process to generate a synthetic spectrum of the narrowed light to be measured by synthesizing at least a first spectrum when a beam spot of the light to be measured is at a first position within the aperture and a second spectrum when the beam spot of the light to be measured is at a second position within the aperture,
the first position includes a position shifted to one side in a predetermined direction from a reference position of the beam spot within the aperture, and
the second position includes a position shifted to the other side in the predetermined direction from the reference position of the beam spot within the aperture.

Appendix 2

The measurement apparatus according to appendix 1, wherein the controller is configured to generate the synthetic spectrum using a spectrum, between the first spectrum and the second spectrum, with lower intensity at each measurement point.

Appendix 3

The measurement apparatus according to appendix 1 or 2, wherein the controller is configured to execute a pre-process to predetermine at least one of the first position or the second position by measurement before executing the first process.

Appendix 4

The measurement apparatus according to appendix 3, wherein the controller is configured, in the pre-process, to calculate a first distance range in which intensity of a light spectrum is maintained, by shifting a position of the beam spot from the reference position to the one side in steps of a predetermined distance, and determine the first position based on the first distance range.

Appendix 5

The measurement apparatus according to appendix 3 or 4, wherein the controller is configured, in the pre-process, to calculate a second distance range in which intensity of a light spectrum is maintained, by shifting a position of the beam spot from the reference position to the other side in steps of a predetermined distance, and determine the second position based on the second distance range.

Appendix 6

The measurement apparatus according to any one of appendices 1 to 5, wherein the controller is configured, in the first process, to determine whether a local peak has occurred between a pair of peaks adjacent to each other in the synthetic spectrum when the first spectrum and the second spectrum have been synthesized.

Appendix 7

The measurement apparatus according to appendix 6, wherein upon determining that the local peak has occurred, the controller generates the synthetic spectrum by synthesizing, in addition to the first spectrum and the second spectrum, a third spectrum when the beam spot is at the reference position.

Appendix 8

The measurement apparatus according to appendix 7, wherein the controller is configured to generate the synthetic spectrum using a spectrum, among the first spectrum, the second spectrum, and the third spectrum, with lowest intensity at each measurement point.

Appendix 9

The measurement apparatus according to any one of appendices 6 to 8, wherein upon determining that the local peak has occurred, the controller causes the local peak to be displayed in a different aspect from other portions.

Appendix 10

The measurement apparatus according to any one of appendices 6 to 9, wherein upon determining that the local peak has occurred, the controller executes an interpolation process based on data on both sides of the local peak, and updates light spectrum data at the local peak.

Appendix 11

The measurement apparatus according to appendix 10, wherein the controller is configured to cause a portion for which data has been updated in the synthetic spectrum to be displayed in a different aspect from other portions.

Appendix 12

The measurement apparatus according to any one of appendices 6 to 11, wherein upon determining that the local peak has occurred, the controller switches to a second process to measure a reference spectrum of the light to be measured at the reference position.

Appendix 13

The measurement apparatus according to any one of appendices 1 to 12, wherein the controller is configured to switch and execute one of the first process and a second process to measure a reference spectrum of the light to be measured at the reference position, in response to a user's selection input.

Appendix 14

The measurement apparatus according to any one of appendices 1 to 13, wherein the reference position includes a center position of the aperture in the predetermined direction.

Appendix 15

The measurement apparatus according to any one of appendices 1 to 14, wherein the predetermined direction includes a shortitudinal direction of the aperture.

Appendix 16

The measurement apparatus according to any one of appendices 1 to 15, wherein a first distance from the reference position to the first position and a second distance from the reference position to the second position are same as each other.

Appendix 17

The measurement apparatus according to any one of appendices 1 to 16, wherein the first position includes a center position of the beam spot when a first end of the beam spot at the one side contacts a first edge of the aperture.

Appendix 18

The measurement apparatus according to any one of appendices 1 to 17, wherein the second position includes a center position of the beam spot when a second end of the beam spot at the other side contacts a second edge of the aperture.

Appendix 19

A measurement method performed by a measurement apparatus including a spectroscope having an optical element in which an aperture to pass light to be measured is formed, the measurement method comprising:
  executing a first process to generate a synthetic spectrum of the narrowed light to be measured by synthesizing at least a first spectrum when a beam spot of the light to be measured is at a first position within the aperture and a second spectrum when the beam spot of the light to be measured is at a second position within the aperture, wherein
  the first position includes a position shifted to one side in a predetermined direction from a reference position of the beam spot within the aperture, and
  the second position includes a position shifted to the other side in the predetermined direction from the reference position of the beam spot within the aperture.

Appendix 20

A program configured to cause a measurement apparatus to execute an operation, the measurement apparatus including a spectroscope having an optical element in which an aperture to pass light to be measured is formed, the operation comprising:
  executing a first process to generate a synthetic spectrum of the narrowed light to be measured by synthesizing at least a first spectrum when a beam spot of the light to be measured is at a first position within the aperture and a second spectrum when the beam spot of the light to be measured is at a second position within the aperture, wherein
  the first position includes a position shifted to one side in a predetermined direction from a reference position of the beam spot within the aperture, and
  the second position includes a position shifted to the other side in the predetermined direction from the reference position of the beam spot within the aperture.

The invention claimed is:
1. A measurement apparatus comprising:
  a controller; and
  a spectroscope having an optical element in which an aperture to pass light to be measured is formed,
  wherein
  the controller is configured to execute a first process to generate a synthetic spectrum of the narrowed light to be measured by synthesizing at least a first spectrum when a beam spot of the light to be measured is at a first position within the aperture and a second spectrum when the beam spot of the light to be measured is at a second position within the aperture, the first position includes a position shifted to one side in a predetermined direction from a reference position of the beam spot within the aperture, and the second position includes a position shifted to the other side in the predetermined direction from the reference position of the beam spot within the aperture.

2. The measurement apparatus according to claim 1, wherein the controller is configured to generate the synthetic spectrum using a spectrum, between the first spectrum and the second spectrum, with lower intensity at each measurement point.

3. The measurement apparatus according to claim 1, wherein the controller is configured to execute a pre-process to predetermine at least one of the first position or the second position by measurement before executing the first process.

4. The measurement apparatus according to claim 3, wherein the controller is configured, in the pre-process, to calculate a first distance range in which intensity of a light spectrum is maintained, by shifting a position of the beam spot from the reference position to the one side in steps of a predetermined distance, and determine the first position based on the first distance range.

5. The measurement apparatus according to claim 3, wherein the controller is configured, in the pre-process, to calculate a second distance range in which intensity of a light spectrum is maintained, by shifting a position of the beam spot from the reference position to the other side in steps of a predetermined distance, and determine the second position based on the second distance range.

6. The measurement apparatus according to claim 1, wherein the controller is configured, in the first process, to determine whether a local peak has occurred between a pair of peaks adjacent to each other in the synthetic spectrum when the first spectrum and the second spectrum have been synthesized.

7. The measurement apparatus according to claim 6, wherein upon determining that the local peak has occurred, the controller generates the synthetic spectrum by synthesizing, in addition to the first spectrum and the second spectrum, a third spectrum when the beam spot is at the reference position.

8. The measurement apparatus according to claim 7, wherein the controller is configured to generate the synthetic spectrum using a spectrum, among the first spectrum, the second spectrum, and the third spectrum, with lowest intensity at each measurement point.

9. The measurement apparatus according to claim 6, wherein upon determining that the local peak has occurred, the controller causes the local peak to be displayed in a different aspect from other portions.

10. The measurement apparatus according to claim 6, wherein upon determining that the local peak has occurred, the controller executes an interpolation process based on data on both sides of the local peak, and updates light spectrum data at the local peak.

11. The measurement apparatus according to claim 10, wherein the controller is configured to cause a portion for which data has been updated in the synthetic spectrum to be displayed in a different aspect from other portions.

12. The measurement apparatus according to claim 6, wherein upon determining that the local peak has occurred, the controller switches to a second process to measure a reference spectrum of the light to be measured at the reference position.

13. The measurement apparatus according to claim 1, wherein the controller is configured to switch and execute one of the first process and a second process to measure a reference spectrum of the light to be measured at the reference position, in response to a user's selection input.

14. The measurement apparatus according to claim 1, wherein the reference position includes a center position of the aperture in the predetermined direction.

15. The measurement apparatus according to claim 1, wherein the predetermined direction includes a shortitudinal direction of the aperture.

16. The measurement apparatus according to claim 1, wherein a first distance from the reference position to the first position and a second distance from the reference position to the second position are same as each other.

17. The measurement apparatus according to claim 1, wherein the first position includes a center position of the beam spot when a first end of the beam spot at the one side contacts a first edge of the aperture.

18. The measurement apparatus according to claim 1, wherein the second position includes a center position of the beam spot when a second end of the beam spot at the other side contacts a second edge of the aperture.

19. A measurement method performed by a measurement apparatus including a spectroscope having an optical element in which an aperture to pass light to be measured is formed, the measurement method comprising:
executing a first process to generate a synthetic spectrum of the narrowed light to be measured by synthesizing at least a first spectrum when a beam spot of the light to be measured is at a first position within the aperture and a second spectrum when the beam spot of the light to be measured is at a second position within the aperture, wherein
the first position includes a position shifted to one side in a predetermined direction from a reference position of the beam spot within the aperture, and
the second position includes a position shifted to the other side in the predetermined direction from the reference position of the beam spot within the aperture.

20. A program configured to cause a measurement apparatus to execute an operation, the measurement apparatus including a spectroscope having an optical element in which an aperture to pass light to be measured is formed, the operation comprising:
executing a first process to generate a synthetic spectrum of the narrowed light to be measured by synthesizing at least a first spectrum when a beam spot of the light to be measured is at a first position within the aperture and a second spectrum when the beam spot of the light to be measured is at a second position within the aperture, wherein
the first position includes a position shifted to one side in a predetermined direction from a reference position of the beam spot within the aperture, and
the second position includes a position shifted to the other side in the predetermined direction from the reference position of the beam spot within the aperture.

* * * * *